(12) United States Patent  
Yasui et al.

(10) Patent No.: US 8,428,842 B2  
(45) Date of Patent: Apr. 23, 2013

(54) SPEED CONTROL DEVICE FOR VEHICLE

(75) Inventors: Yoshiyuki Yasui, Nagoya (JP); Hideaki Koto, Anjo (JP); Hiroyuki Kodama, Kariya (JP); Masaki Maruyama, Nagoya (JP); Takayuki Miyajima, Okazaki (JP)

(73) Assignees: Advics. Co., Ltd., Kariya (JP); Aisin Aw Co., Ltd., Anjo-Shi (JP)

( * ) Notice: Subject to any disclaimer, the term of this patent is extended or adjusted under 35 U.S.C. 154(b) by 553 days.

(21) Appl. No.: 12/569,081

(22) Filed: Sep. 29, 2009

(65) Prior Publication Data

US 2010/0082216 A1 Apr. 1, 2010

(30) Foreign Application Priority Data

Sep. 29, 2008 (JP) ................................. 2008-249568

(51) Int. Cl.
*B60T 8/32* (2006.01)
(52) U.S. Cl.
USPC ............................................. 701/93; 180/170
(58) Field of Classification Search .................... 701/70, 701/72, 93, 408, 409, 468; 180/170, 171, 180/172
See application file for complete search history.

(56) References Cited

U.S. PATENT DOCUMENTS

| 7,400,963 | B2  | 7/2008 | Lee et al. |
| 7,751,962 | B2* | 7/2010 | Yamamura et al. ............. 701/93 |
| 2007/0208485 | A1* | 9/2007 | Yamamura et al. ............. 701/93 |
| 2008/0059037 | A1 | 3/2008 | Isaji et al. |
| 2009/0187322 | A1 | 7/2009 | Yasui et al. |
| 2010/0100296 | A1 | 4/2010 | Ito |

FOREIGN PATENT DOCUMENTS

| CN | 101028798 A | 9/2007 |
| EP | 2 082 936 A2 | 7/2009 |
| JP | 2005-170152 A | 6/2005 |
| JP | 2007-230440 A | 9/2007 |
| JP | 2008-030677 A | 2/2008 |
| JP | 2008/062672 A | 3/2008 |
| WO | WO 2007/070160 A2 | 6/2007 |
| WO | WO 2008/108220 A1 | 9/2008 |

OTHER PUBLICATIONS

Search Report dated Nov. 30, 2010, issued by the European Patent Office in corresponding European Patent Application No. 09171351.

(Continued)

*Primary Examiner* — Thomas Black
*Assistant Examiner* — Ce Li
(74) *Attorney, Agent, or Firm* — Buchanan Ingersoll & Rooney PC

(57) ABSTRACT

A speed control device for a vehicle includes a vehicle speed obtaining means obtaining a vehicle speed, a shape obtaining means obtaining a curve shape, a position obtaining means obtaining a positional relationship between a curve and the vehicle, a target vehicle speed determining means determining a target vehicle speed based on the curve shape and the positional relationship, a vehicle speed controlling means controlling the vehicle speed based on the target vehicle speed and the vehicle speed, and an acceleration operation quantity obtaining means obtaining an operation quantity of an acceleration operating member operated by a driver, wherein the target vehicle speed determining means includes a modification means modifying the target vehicle speed based on the operation quantity so that the target vehicle speed obtained when the operation variable is greater than zero becomes a greater value than the target vehicle speed obtained when the operation quantity is zero.

16 Claims, 13 Drawing Sheets

OTHER PUBLICATIONS

Japanese Office Action issued Oct. 31, 2012 by the Japanese Patent Office in corresponding Japanese Patent Application No. 2008-249568 and partial English translation thereof.

Chinese First Office Action dated Dec. 5, 2012 issued in the corresponding Chinese Patent Application No. 200910173876.5 and English language translation.

* cited by examiner

SPEED CONTROL DEVICE FOR VEHICLE

CROSS REFERENCE TO RELATED APPLICATIONS

This application is based on and claims priority under 35 U.S.C. §119 to Japanese Patent Application 2008-249568, filed on Sep. 29, 2008, the entire content of which is incorporated herein by reference.

FIELD OF THE INVENTION

The present invention generally relates to a speed control device for a vehicle. More specifically, the present invention pertains to a speed control device, which executes a speed control in a case where the vehicle travels through a curve.

BACKGROUND

Disclosed in JP2005-170152A is a deceleration control device that reduces a controlling amount (a controlling level) of a deceleration control in a case where the vehicle is determined to travel a near side of a curve exit, so that a decelerating degree of a vehicle is reduced in order to avoid a driver from feeling discomfort because of insufficient acceleration of the vehicle in the vicinity of the curve exit, which may occur when the deceleration control is executed while the vehicle is traveling on the curve. According to the deceleration control device disclosed in JP2005-170152A, the vehicle is allowed to smoothly accelerate at the near side of the curve exit.

Generally, the driver may feel discomfort when a targeted acceleration of the vehicle is not achieved, such in a case where the vehicle is decelerated by the deceleration control contrary to a driver's intention of accelerating the vehicle. In other words, the discomfort, which may be caused due to insufficient acceleration and the like, may be felt by the driver not only at the near side of the curve exit, but also while the vehicle travels on the curve (i.e. at any zone of the curve).

A need thus exists to provide a speed control device for a vehicle, which causes less discomfort for a driver and which achieves a smooth speed control in response to a driver's intention of accelerating the vehicle.

SUMMARY OF THE INVENTION

According to an aspect of the present invention, a speed control device for a vehicle includes a vehicle speed obtaining means for obtaining a speed of the vehicle, a shape obtaining means for obtaining a shape of a curve existing ahead of the vehicle, a position obtaining means for obtaining a positional relationship between the curve and the vehicle, a target vehicle speed determining means for determining a target vehicle speed in a case where the vehicle travels through the curve, on the basis of the shape of the curve and the positional relationship, a vehicle speed controlling means for controlling the speed of the vehicle on the basis of the target vehicle speed and the speed of the vehicle, and an acceleration operation quantity obtaining means for obtaining an operation quantity of an acceleration operating member, which is to be operated by a driver of the vehicle, wherein the target vehicle speed determining means includes a modification means for modifying the target vehicle speed on the basis of the operation quantity so that the target vehicle speed in a case where the operation quantity is greater than zero becomes a greater value than the target vehicle speed in a case where the operation quantity is zero.

According to another aspect of the present invention, a speed control device for a vehicle includes a vehicle speed obtaining means for obtaining a speed of the vehicle, a shape obtaining means for obtaining a shape of a curve existing ahead of the vehicle, a reference determining means for determining an appropriate vehicle speed, by which the vehicle is to appropriately travel through the curve, and a reference point, which exists on the curve and which is a point by which the speed of the vehicle is to be decreased down to the appropriate vehicle speed, on the basis of the shape of the curve, a distance obtaining means for obtaining a relative distance of a zone between the reference point and the vehicle, a target vehicle speed determining means for determining a target vehicle speed for decreasing the speed of the vehicle down to the appropriate vehicle speed on the basis of the reference point, the appropriate vehicle speed and the relative distance, a vehicle speed controlling means for controlling the speed of the vehicle on the basis of the target vehicle speed and the speed of the vehicle, and an acceleration operation quantity obtaining means for obtaining an operation quantity of an acceleration operating member, which is to be operated by a driver of the vehicle, wherein the target vehicle speed determining means includes a modification means for modifying the target vehicle speed on the basis of the operation quantity so that the target vehicle speed in a case where the operation quantity is greater than zero becomes a greater value than the target vehicle speed in a case where the operation quantity is zero.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of a speed control device for a vehicle will be described below in accordance with the attached drawings.

<Configuration>

Figure 1:
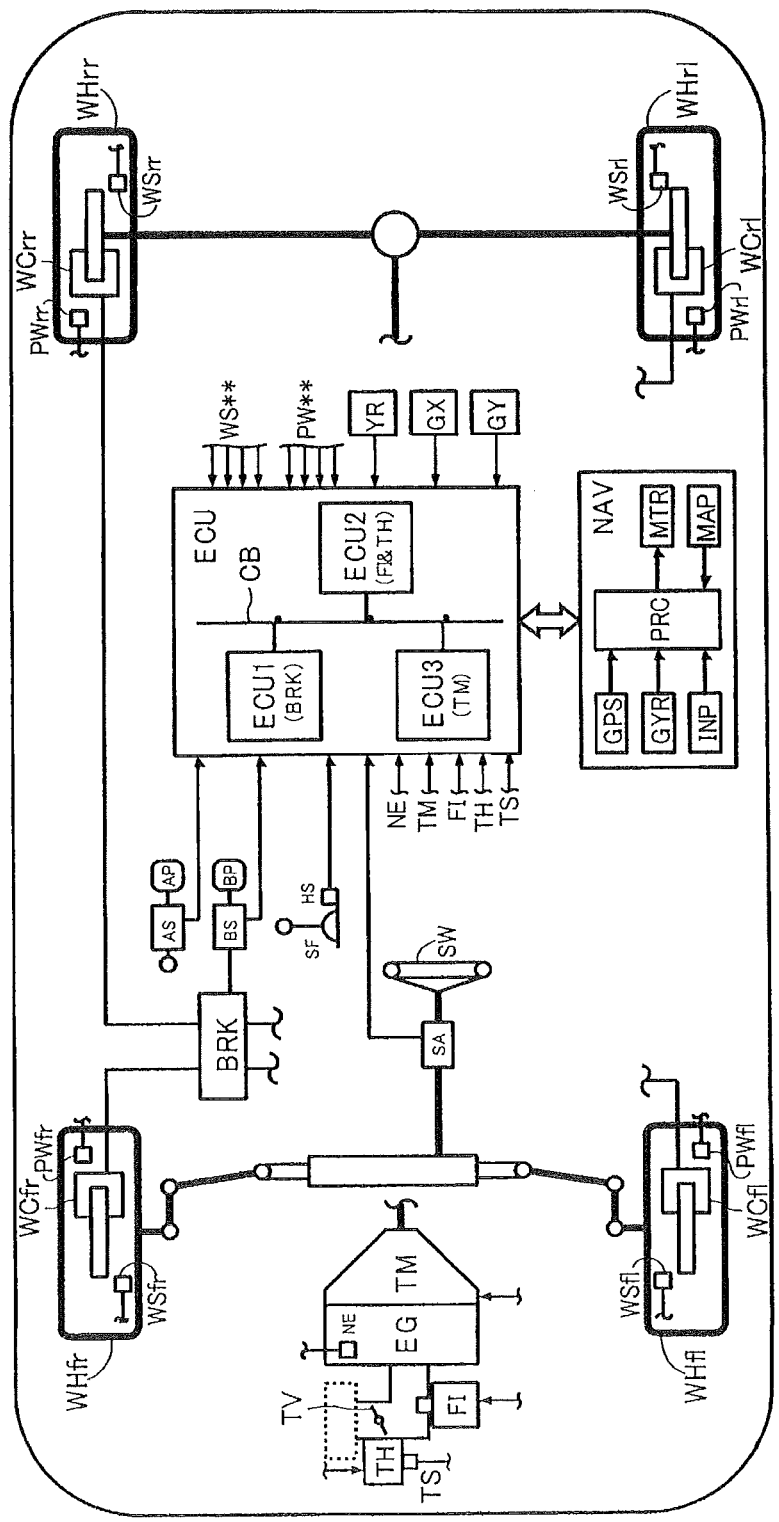
FIG. 1 is a diagram schematically illustrating a configuration example of a vehicle to which a speed control device for a vehicle according to an embodiment is adapted.

Illustrated in FIG. 1 is a schematic configuration of the vehicle to which the speed control device (which will be hereinafter referred to simply as a device) according to the embodiment is provided. The device includes an engine EG, which serves as a power source of the vehicle, an automatic transmission TM, a brake actuator BRK, an electronic control unit ECU and a navigation device NAV.

For example, an internal combustion engine is used as the engine EG. More specifically, an opening degree of a throttle valve TV is adjusted by a throttle actuator TH in response to an operation of an acceleration pedal (an acceleration operating member) AP by a driver. Accordingly, an amount of fuel proportional to an inhaled air volume, which is adjusted in response to the opening degree of the throttle valve TV, is injected by a fuel injection actuator FI (an injector). As a result, the engine EG generates an output torque in response to the operation of the acceleration pedal AP by the driver.

A multi-stage automatic transmission having plural shift stages or a continuously variable automatic transmission having no shift stages may be used as the automatic transmission TM. The automatic transmission TM is configured so as to automatically (without being influenced by an operation of a gear lever SF by the driver) change a reduction ratio (which is obtained by dividing a rotational speed of an output shaft of the engine EG (i.e. rotational speed of an input shaft of the transmission TM) by a rotational speed of an output shaft of the transmission TM) in response to an operation condition of the engine EG and a position of the gear lever SF, which serves as a shift operating member.

The brake actuator BRK has a known configuration in which plural electromagnetic valves, a hydraulic pump, a motor and the like are included. The brake actuator BRK supplies a brake pressure (brake hydraulic pressure) in response to an operation of a brake pedal BP, which serves as a brake operating member, by the driver to a wheel cylinder WC of each wheel WH in a case where a brake control is not executed. Further, the brake actuator BRK is configured to individually adjust the brake pressure within the wheel cylinder WC of each wheel WH independently of the operation of the brake pedal BP (and the operation of the acceleration pedal AP) in a case where the brake control is executed.

Symbols '' are used to comprehensively indicate wheels, specifically, indicates a front-left wheel, 'fr' indicate a front-right wheel, 'rl' indicates a rear-left wheel, and 'rr' indicates a rear-right wheel. Hence, for example, the wheel cylinder WC comprehensively indicates a front-left wheel cylinder WCfl, a front-right wheel cylinder WCfr, a rear-left wheel cylinder WCrl, and a rear-right wheel cylinder WCrr.

The device includes a wheel speed sensor WS for detecting a wheel speed of the wheel WH, a brake pressure sensor PW for detecting the brake pressure within the wheel cylinder WC, a steering wheel angle sensor SA for detecting a rotational angle (from a neutral position) of a steering wheel SW, a yaw rate sensor YR for detecting a yaw rate of a vehicle body, a longitudinal acceleration sensor GX for detecting an acceleration (a deceleration) generated in a front-rear direction (a longitudinal direction) of the vehicle body, a lateral acceleration sensor GY for detecting an acceleration generated in a lateral direction of the vehicle body, an engine rotational speed sensor NE for detecting a rotational speed of the output shaft of the engine EG, an acceleration operation sensor AS for detecting an operation quantity of the acceleration pedal AP (the acceleration operating member), a brake operation sensor BS for detecting an operation quantity of the brake pedal BP, a shift position sensor HS for detecting the position of the gear lever SF, and a throttle valve opening degree sensor TS for detecting the opening degree of the throttle valve TV.

The electronic control unit ECU is a microcomputer that electronically controls a power train system and a chassis system of the vehicle. The electronic control unit ECU is electrically connected to above-described each actuator, above-described each sensor and the automatic transmission TM. Alternatively, the electronic control unit ECU is configured so as to communicate with above-described each actuator, above-described each sensor and the automatic transmission TM via a network. The electronic control unit ECU is configured with plural control units (ECU 1, ECU 2 and ECU 3), which are connected to one another via a communication bus CB.

The ECU 1 included in the electronic control unit ECU is a wheel brake control unit. More specifically, the ECU 1 is configured so as to execute a brake pressure control (wheel brake control) such as a known vehicle stability control (an electronic stability control, ESC control), an anti-skid control (ABS control), a traction control (TCS control) and the like by controlling the brake actuator BRK on the basis of signals outputted from the wheel speed sensor WS, the longitudinal acceleration sensor GX, the lateral acceleration sensor GY, the yaw rate sensor RY and the like. Furthermore, the ECU 1 is configured so as to calculate a vehicle speed Vx on the basis of a detection result of the wheel speed sensor WS (i.e. a wheel speed Vw**).

The ECU 2 included in the electronic control unit ECU is an engine control unit. More specifically, the ECU 2 is configured so as to execute an output torque control (an engine control) of the engine EG by controlling the throttle actuator TH and the fuel injection actuator FI on the basis of a signal outputted from the acceleration operation sensor AS and the like.

The ECU 3 included in the electronic control unit ECU is an automatic transmission control unit. More specifically, the ECU 3 is configured so as to execute a reduction ratio control (a transmission control) by controlling the automatic transmission TM on the basis of a signal outputted from the shift position sensor HS and the like.

The navigation device NAV includes a navigation processor PRC. The navigation processor PRC is electrically connected to a vehicle position detecting means (global positioning system) GPS, a yaw rate gyro GYR, an input portion INP, a storage portion MAP and a display portion (display) MTR. Furthermore, the navigation device NAV is electrically connected to the electronic control unit ECU. Alternatively, the navigation device NAV is configured so as to communicate with the electronic control unit ECU via radio waves.

The vehicle position detecting means GPS is configured so as to detect a position (latitude, longitude and the like) of the vehicle by using one of known methods utilizing a positioning signal from a satellite. The yaw rate gyro GYR is configured to detect an angular velocity (the yaw rate) of the vehicle body. The input portion INP is configured so as to input therein an operation relating to a navigation function performed by the driver. The storage portion MAP memorizes therein various information, such as map information, road information and the like.

The navigation processor PRC is configured so as to comprehensively process signals from the vehicle position detecting means GPS, the yaw rate gyro GYR, the input portion INP and the storage portion MAP and so as to display the processed results (information relating to the navigation function) on the display portion MTR.

[Brief Overview of Speed Control Executed by Device]

Figure 2:
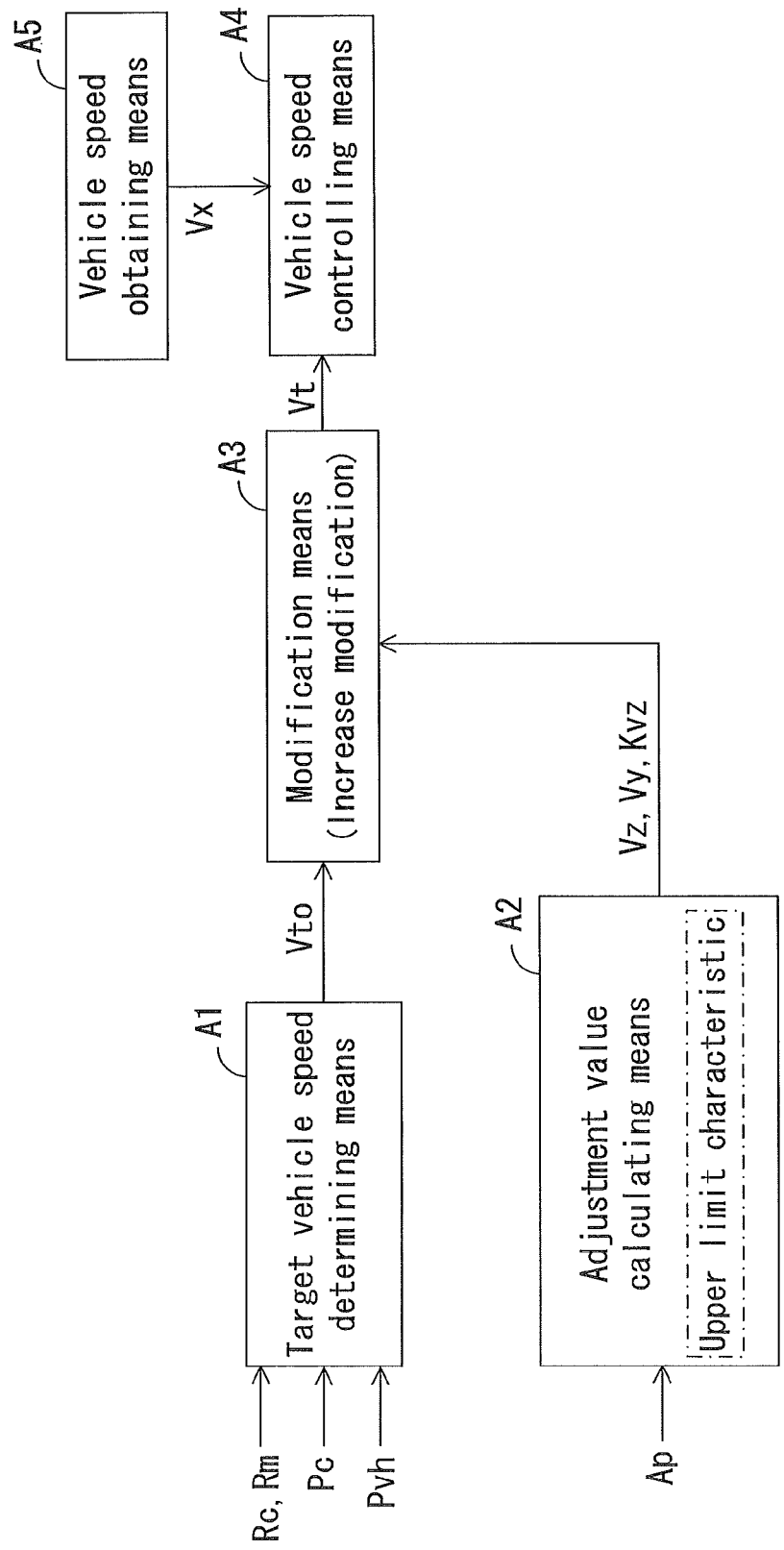
FIG. 2 is a functional block diagram for explaining an overview of a speed control executed by the device illustrated in FIG. 1.
Figure 3:
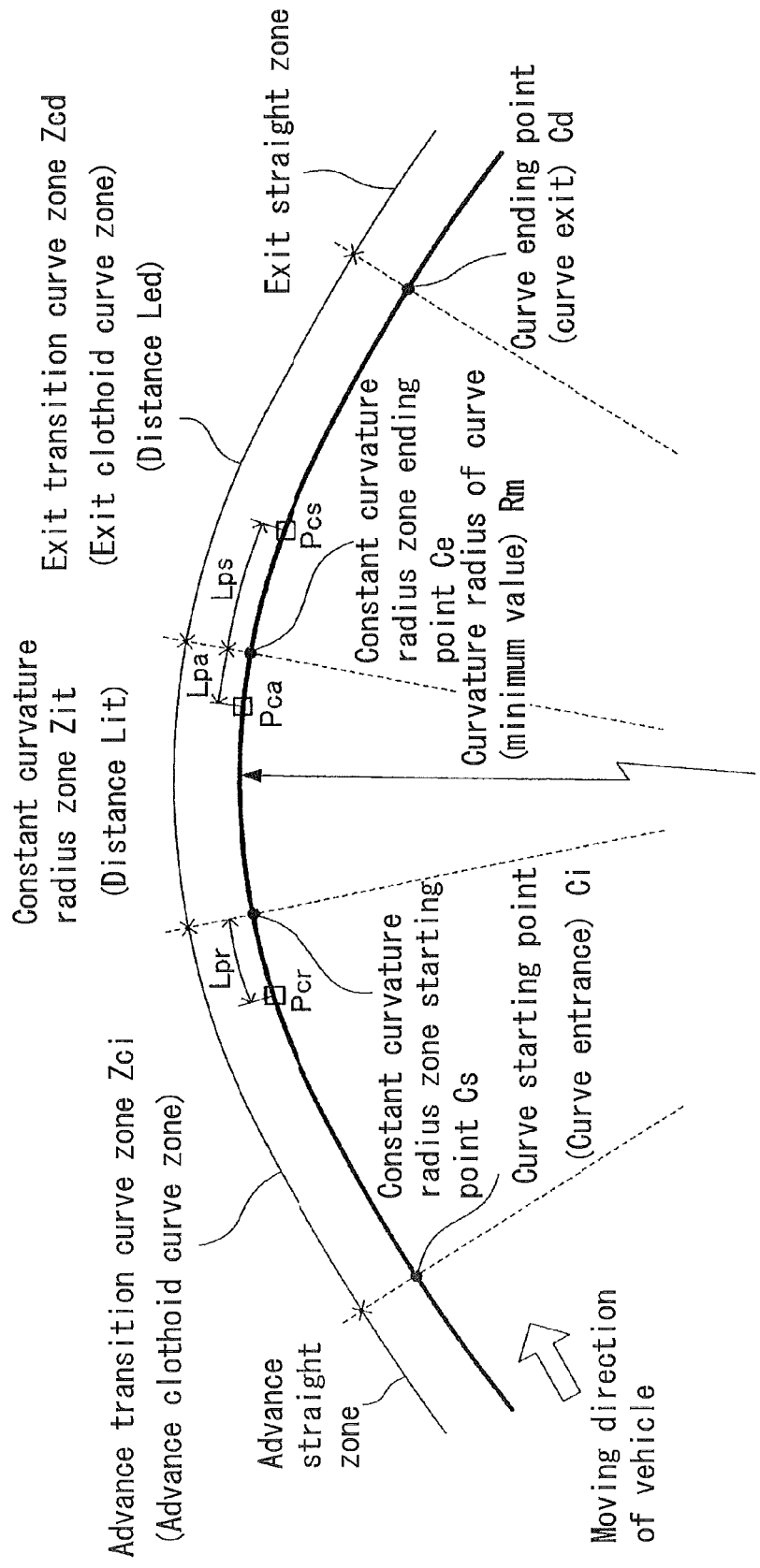
FIG. 3 is a diagram illustrating an example of a curve shape.

A brief overview of a speed control, which is executed by the device having the above-described configuration, will be given below with reference to FIG. 2. In the explanation of the speed control, it is assumed that the vehicle is to travel through a curve illustrated in FIG. 3. The curve illustrated in FIG. 3 is structured with an advance transition curve zone Zci (a transition curve zone on a curve entrance side, a zone at which a curvature radius gradually decreases as the vehicle advances), a constant curvature radius zone Zit and an exit transition curve zone Zcd (a transition curve zone on a curve exit side, a zone at which the curvature radius gradually increases as the vehicle advances) in this order towards a curve ending point Cd (a curve exit) from a curve starting point Ci (a curve entrance). The transition curve is, for example, structured by a clothoid curve. The transition curve is formed on the curve so that the vehicle smoothly travels through the curve while the driver gradually steers the steering wheel SW and then returns the steering wheel SW without a sudden operation of the steering wheel SW.

Firstly, the navigation device NAV (a shape obtaining means) obtains a shape Rc of a single curve (which will be hereinafter referred to as a curve shape Rc) existing ahead of the vehicle and a minimum curvature radius Rm of the curve. Furthermore, the navigation device NAV (a position obtaining means) obtains a positional relationship between the curve and the vehicle (i.e. a position of the vehicle relative to the curve, a distance between the vehicle and the curve). More specifically, the navigation device NAV (a vehicle position obtaining means) obtains a vehicle position Pvh, which is the position of the vehicle to which the navigation device NAV is provided. Furthermore, the navigation device NAV (a curve position obtaining means) obtains a curve position Pc, so that the navigation device NAV obtains the positional relationship between the curve and the vehicle on the basis of the vehicle position Pvh and the curve position Pc.

A target vehicle speed determining means A1 determines a target vehicle speed Vto, by which the vehicle is supposed to travel through the single curve stably, on the basis of the curve shape (Rc, Rm) and the positional relationship (Pc, Pvh). More specifically, a calculation map (a target vehicle speed characteristic) for specifying the target vehicle speed Vto is determined on the basis of the curve shape (Rc, Rm). The target vehicle speed Vto relative to the vehicle position is determined by inputting the positional relationship (Pc, Pvh) into the calculation map.

An adjustment valve calculating means A2 calculates an adjustment value (i.e. an adjustment vehicle speed Vz, an adjustment vehicle speed Vy, an adjustment coefficient Kvz) for adjusting the target vehicle speed Vto on the basis of the operation quantity (an acceleration operation quantity) of the acceleration operating member AP by the driver of the vehicle, which is obtained by the acceleration operation sensor AS (an acceleration operation quantity obtaining means).

A modification means A3 modifies the target vehicle speed Vto on the basis of the adjustment value in an increasing direction in order to obtain a target vehicle speed Vt ($\geq$ Vto). More specifically, the target vehicle speed Vt is modified so that the greater the acceleration operation quantity Ap is, the greater value the target vehicle speed Vt is determined to be. Furthermore, an upper limit characteristic (Vz1, Vz4, Kz6, Vy1) may be set for the modification of the target vehicle speed Vto (i.e. for obtaining the target vehicle speed Vt) independently of (without being influenced by) the acceleration operation quantity Ap.

Furthermore, even in a case where the vehicle travels in the zone, in which the curvature radius of the curve gradually decreases, (i.e. in the advance transition curve zone Zci in FIG. 3, a zone in which the vehicle speed is decelerated by the speed control (a deceleration zone)), the target vehicle speed Vto may be adjusted to obtain the target vehicle speed Vt while allowing the vehicle to be accelerated.

Figure 4:
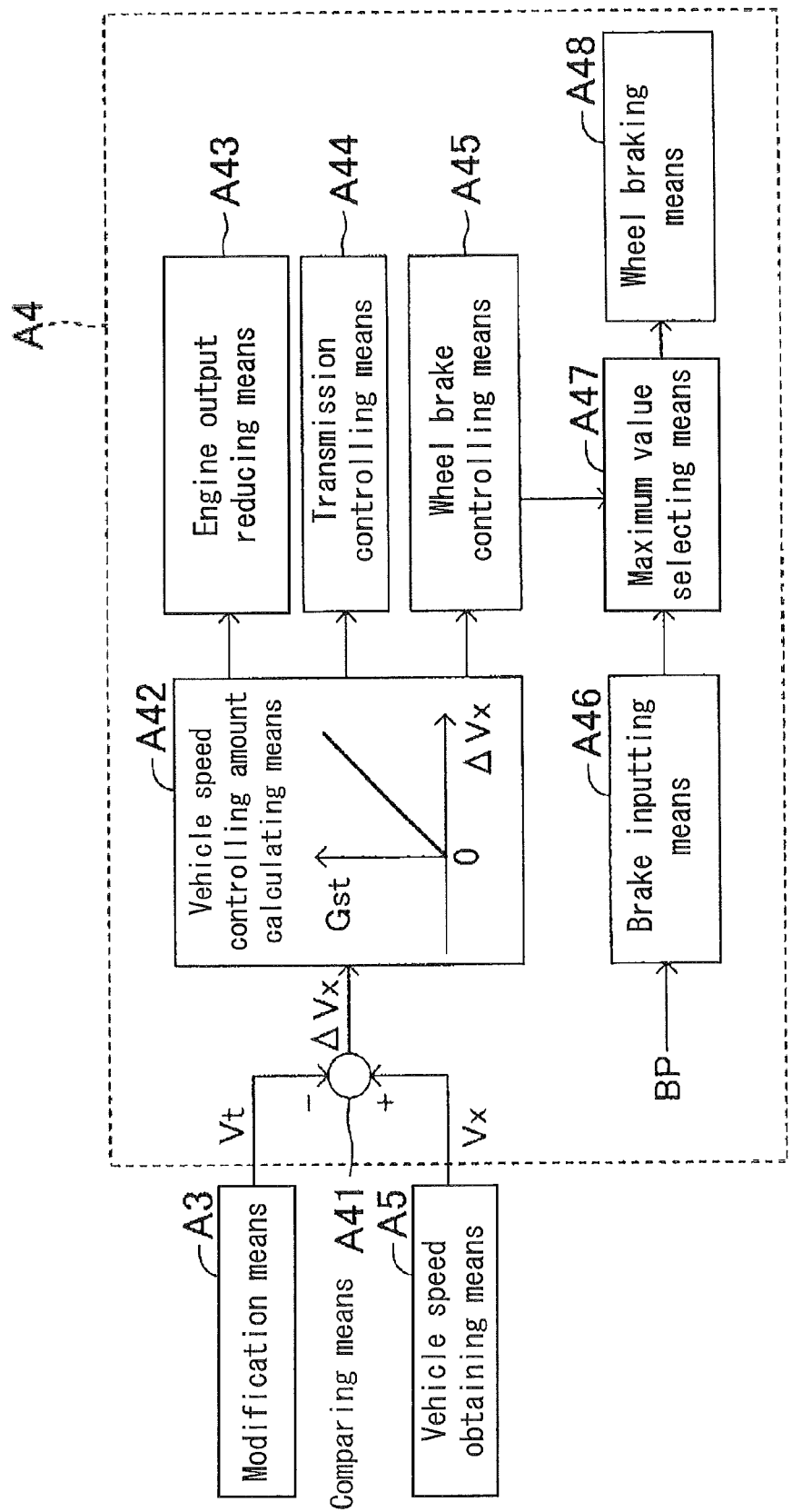
FIG. 4 is a functional block diagram for explaining a speed control, which is executed by a vehicle speed controlling means illustrated in FIG. 2.

A vehicle speed controlling means A4 controls the speed of the vehicle on the basis of the target vehicle Vt and an actual vehicle speed Vx, which is obtained by a vehicle speed obtaining means A5. More specifically, as illustrated in FIG. 4, a difference between the actual vehicle speed Vx and the target vehicle speed Vt (i.e. a speed deviation $\Delta$Vx) is calculated at a comparing means A41. Then, a vehicle speed controlling amount Gst is calculated at a vehicle speed controlling amount calculating means A42 on the basis of the speed deviation $\Delta$Vx and a map illustrated in FIG. 4.

The actual vehicle speed Vx is controlled so as not to exceed the target vehicle speed Vt on the basis of the vehicle speed controlling amount Gst by using one of a reduction control of the engine output executed by an engine output reducing means A43, a control on the reduction ratio executed by a transmission controlling means A44 and a control on a wheel brake (the brake pressure) executed by a wheel brake controlling means A45. In a case where the engine output reduction control is used in order to control the actual vehicle speed Vx so as not to exceed the target vehicle speed Vt, for example, one of the opening degree of the throttle valve TV, an ignition timing and an fuel injection amount is controlled.

Furthermore, in a case where the operation of the brake pedal BP by the driver is detected by a brake inputting means A46, a maximum value selecting means A47 selects either a braking torque (the braking pressure) generated by the wheel brake controlling means A45 or a braking torque (the braking pressure) generated in response to the operation performed by the driver, which has a greater value. Then, a wheel braking means A48 applies the selected braking torque (the braking pressure) in order to allow the braking torque generated in response to the braking operation by the driver to override the braking torque generated by the wheel brake controlling means A45 in a curve vehicle speed control (i.e. a vehicle speed control on the curve).

Accordingly, because the target vehicle speed Vt is adjusted on the basis of the acceleration operation quantity Ap, the acceleration operation by the driver is reflected on the speed control in the entire zone of the curve (i.e. a zone between a point at which the speed control is started and a point at which the speed control is ended). As a result, the driver may feel less discomfort not only at the curve exit, but also in the entire curve zone (i.e. while the vehicle travels through the curve). Furthermore, by setting the upper limit on the modification of the target vehicle speed Vt, independently of (without being influenced by) the acceleration operation quantity Ap, unnecessary acceleration operation may be restricted, which may result in allowing the vehicle to travel through the curve stably.

Additionally, in the deceleration zone, the acceleration of the vehicle is restricted, however, the vehicle is not decelerated but accelerated. Therefore, the driver may feel further less discomfort. The target vehicle speed determining means A1, the adjustment value calculating means A2 and the modification means A3, which are indicated in FIG. 2, serve as a target vehicle speed determining means.

<Curve Vehicle Speed Control>

Figure 5:
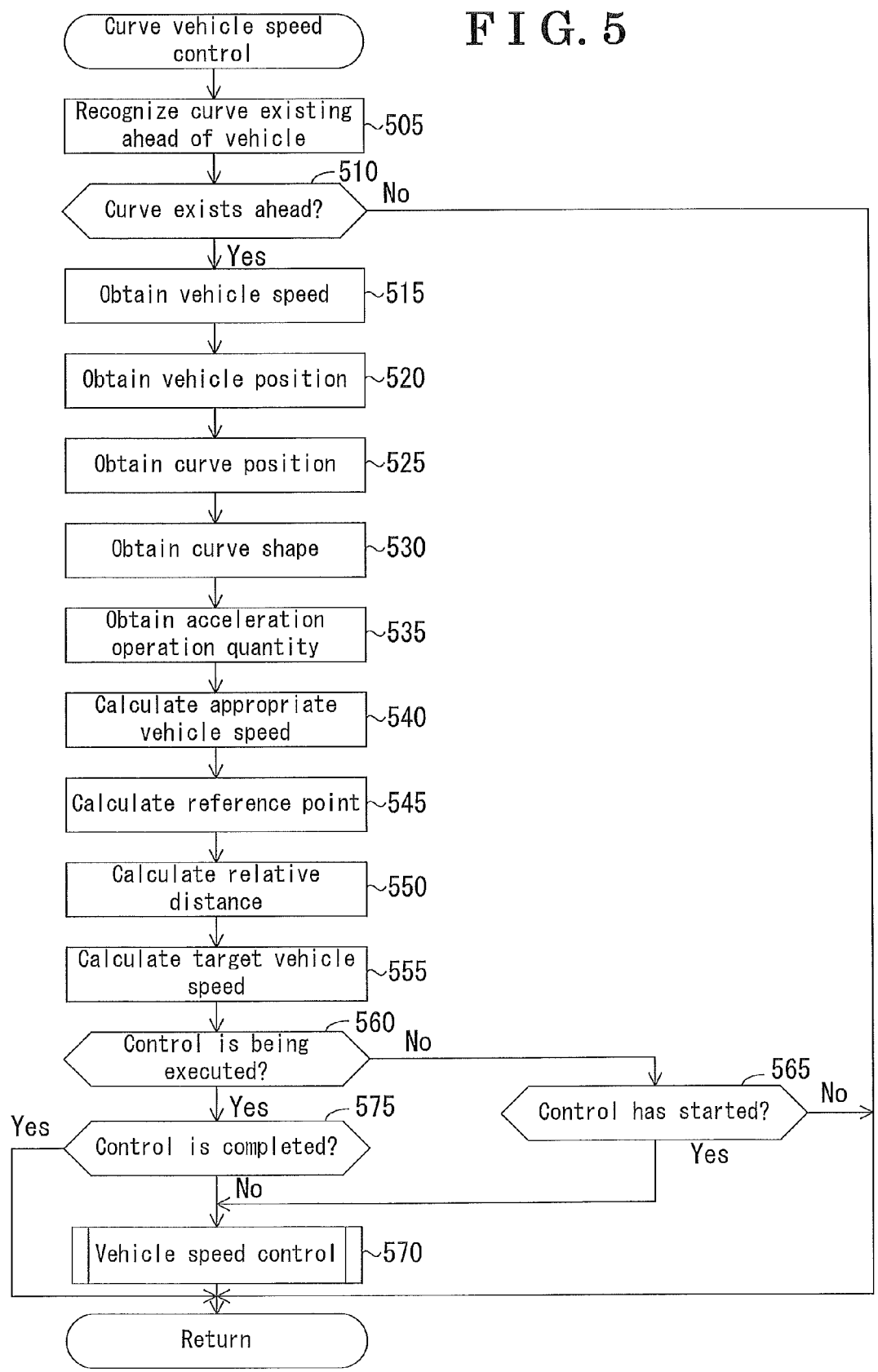
FIG. 5 is a flowchart illustrating a curve vehicle speed control executed by the device illustrated in FIG. 1.

The curve vehicle speed control, which is one specific example of the speed control executed by the device, will be described below with reference to FIG. 5. In the curve vehicle speed control, the speed of the vehicle is controlled on the basis of the actual vehicle speed Vx, the shape Rc of the curve existing immediately ahead of the vehicle and a relative distance between the curve and the vehicle (i.e. the distance between the curve and the vehicle), so that the vehicle stably and properly travels through the curve. More specifically, in the curve vehicle speed control, the vehicle speed is adjusted by the vehicle speed controlling means A4 executing one of the control on the engine output, the control on the reduction ratio and the control on the wheel brake.

Firstly, in step 505, a process for recognizing the existence of the curve ahead of the vehicle is executed. More specifically, the recognition of the curve is performed by the navigation device NAV. In step 510, it is determined whether or not the curve exists ahead of the vehicle. In a case where it is determined that the curve exists ahead of the vehicle, processes following step 515 for the curve vehicle speed control are executed.

In step 515 (i.e. the vehicle speed obtaining means), the vehicle speed Vx is obtained. In step 520 (i.e. the position obtaining means), the vehicle position Pvh is obtained. More specifically, the vehicle position Pvh is obtained by the global positioning system GPS of the navigation device NAV.

Following step 520, the position Pc of the curve existing immediately ahead of the vehicle is obtained in step 525 (i.e. the position obtaining means), and then, the curve shape Rc is obtained in step 530 (i.e. the shape obtaining means). The curve position Pc and the curve shape Rc (e.g. the curvature radius of the curve and the like) are read out from curve information stored in the map information in the navigation device NAV. Alternatively, the curvature radius of the curve may be estimated in a manner where, positions of points (node points) on a road are memorized and then smoothly and geometrically connecting the points, so that the curvature radius of the curve is estimated on the basis of a line connecting the points (see e.g. JP3378490B).

In step 535, the operation quantity (the acceleration operation quantity Ap) of the acceleration pedal AP by the driver is obtained on the basis of an output from the acceleration operation sensor AS (the acceleration operation quantity obtaining means).

In step 540 (a reference determining means), an appropriate vehicle speed Vqo, by which the vehicle is supposed to travel through the curve stably and properly, is calculated on the basis of the curvature radius of the curve. More specifically, the appropriate vehicle speed Vqo is calculated on the basis of, for example, the curvature radius in the zone in which the curvature radius of the curve becomes constant (i.e. the constant curvature radius zone Zit in FIG. 3). Alternatively, the appropriate vehicle speed Vqo may be calculated on the basis of the minimum curvature radius Rm of the curve.

Figure 6:
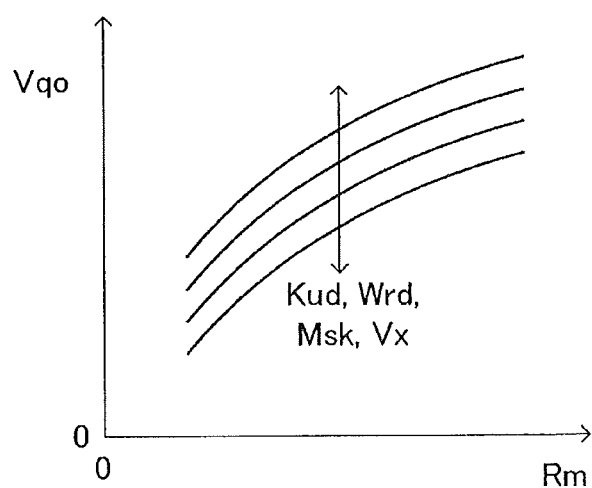
FIG. 6 is a graph illustrating a calculation map, which is referred to in a case where an appropriate vehicle speed at a curve is calculated.

As illustrated in FIG. 6, the greater the curvature radius of the curve is (i.e. the greater the minimum curvature radius Rm is), the greater value the appropriate vehicle speed Vqo is calculated to be. In the example illustrated in FIG. 6, the appropriate vehicle speed Vqo is determined so that the vehicle travels through the curve properly while receiving a predetermined constant lateral acceleration without being influenced by the curvature radius.

Furthermore, the appropriate vehicle speed Vqo may be adjusted on the basis of one of or more of an increasing/decreasing inclination gradient Kud, a road width (width) Wrd, an ahead visibility Msk and the vehicle speed Vx. In a case where the increasing/decreasing inclination gradient Kud indicates a decreasing inclination, the appropriate vehicle speed Vqo is adjusted to be a smaller value when comparing to a case where the vehicle travels on a flat road (i.e. on a road having no inclination). On the other hand, in a case where the increasing/decreasing inclination gradient Kud indicates an increasing inclination, the appropriate vehicle speed Vqo is adjusted to be a greater value when comparing to the case where the vehicle travels on the flat road (i.e. on the road having no inclination). Furthermore, the narrower the road width Wrd is, the smaller value the appropriate vehicle speed Vqo is adjusted to be. Moreover, the worse the ahead visibility Msk is, the smaller value the appropriate vehicle speed Vqo is adjusted to be. The greater the vehicle speed Vx is, the smaller value the appropriate vehicle speed Vqo is adjusted to be.

Then, in step 545 (the reference determining means), a reference point is calculated. The reference point is a point that is used as a reference for specifying a vehicle speed characteristic to be achieved by the curve vehicle speed control. For example, a deceleration reference point Pcr, which is a reference point of an entrance of a zone at which the vehicle speed Vx is to be maintained at the appropriate vehicle speed Vqo, a maintenance reference point Pca, which is a reference point of an exit of the zone at which the vehicle speed Vx is to be maintained at the appropriate vehicle speed Vqo, and an acceleration reference point Pcs, which is a reference point of an exit of a zone at which an acceleration of the vehicle is to be restricted, are used as reference points (see e.g. FIG. 9).

Figure 7:
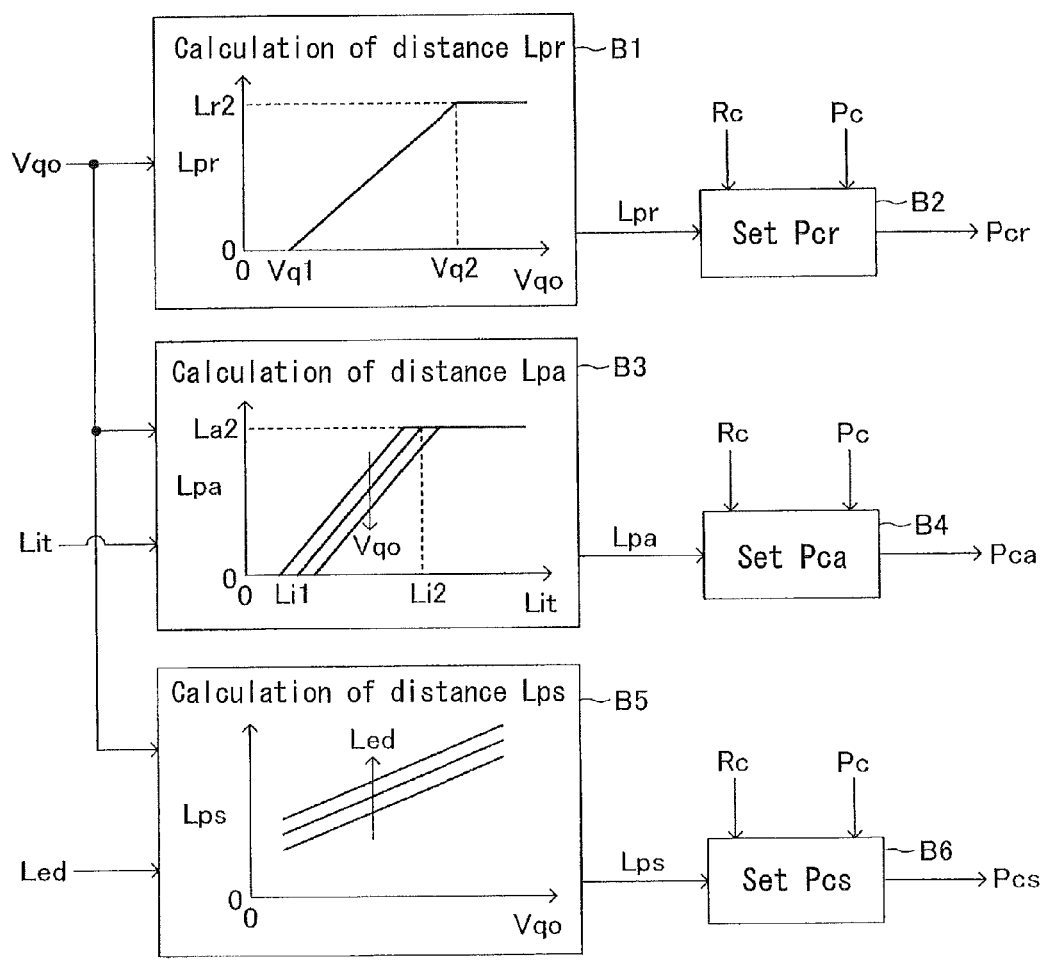
FIG. 7 is a functional block diagram for explaining a detailed process of a calculation executed by the device illustrated in FIG. 1 in order to obtain a reference point.

The detailed process executed at step 545 will be explained below with reference to FIG. 7. In block B1, a distance Lpr (see FIG. 3) for determining the deceleration reference point Pcr is calculated on the basis of the appropriate vehicle speed Vqo. More specifically, in a case where the appropriate vehicle speed Vqo is equal to or smaller than a predetermined value Vq1, the distance Lpr is calculated to zero (Lpr=0). On the other hand, in a case where the appropriate vehicle speed Vqo is greater than the predetermined value Vq1 (Vqo>Vq1), the distance Lpr is calculated in a manner where the greater the appropriate vehicle speed Vqo is, the greater value the distance Lpr is calculated to be.

In block B2, the deceleration reference point Pcr is determined on the basis of the curve position Pc, the curve shape Rc and the distance Lpr. The deceleration reference point Pcr is set as a point on the curve closer to the curve starting point Ci relative to a point Cs by the distance Lpr. The point Cs (i.e. a constant curvature radius zone starting point Cs) is an entrance (a starting point) of the zone at which the curvature radius of the curve becomes constant, a point positioned the closest to the vehicle within the zone at which the curvature radius becomes constant, or one of points at which the curvature radius of the curve becomes the minimum and which exists the closest to the vehicle. Accordingly, the deceleration reference point Pcr is determined on the basis of the curve shape Rc, the distance Lpr and the point Cs.

The deceleration reference point Pcr is set in view of a possibility of an error included in the map information and the like. Hence, by setting the deceleration reference point Pcr, which corresponds to the entrance (the starting point) of the zone at which the vehicle speed is to be maintained at the appropriate vehicle speed Vqo, at the point closer to the curve starting point Ci relative to the point Cs by the distance Lpr, a deceleration of the vehicle by the curve vehicle speed control may be started earlier. As a result, an occurrence of a case where an actual point at which the vehicle speed is controlled to be maintained at the appropriate vehicle speed Vqo becomes a point farther than the point Cs (i.e. a point farther from the vehicle relative to the point Cs) because of an error and the like may be avoided.

Additionally, the distance Lpr may be set as a constant value. Furthermore, the deceleration reference point Pcr may be set at the point Cs (i.e. the starting point of the zone at which the curvature radius of the curve becomes constant or the point at which the curvature radius of the curve becomes the minimum). The point Cs is determined on the basis of the curve shape Rc and the curve position Pc.

In block B3, a distance Lpa (see FIG. 3) for determining the maintenance reference point Pca is calculated on the basis of the appropriate vehicle speed Vqo and a distance Lit of the constant curvature radius zone Zit. More specifically, in a case where the distance Lit is equal to or smaller than a predetermined value Lit1, the distance Lpa is calculated to be zero (Lpa=0). On the other hand, in a case where the distance Lit is greater than the predetermined value Lit1 (Lit>Lit1), the distance Lpa is calculated in a manner where the greater the distance Lit becomes, the greater value the distance Lpa is calculated to be. Additionally, the greater the appropriate vehicle speed Vqo is, the smaller value the distance Lpa is calculated to be. The constant curvature radius zone Zit may not exist (i.e. Lit=0) depending on the curve shape. In this case, the point Cs corresponds to a point Ce (i.e. a constant curvature radius zone ending point Ce).

In block B4, the maintenance reference point Pca is determined on the basis of the curve position Pc, the curve shape Rc and the distance Lpa. The maintenance reference point Pca is set at a point on the curve positioned closer to the curve starting point Ci relative to the point Ce (see FIG. 3) by the distance Lpa. The point Ce is an ending point of the zone at which the curvature radius of the curve is maintained to be constant, more specifically, a point which is positioned the farthest from the vehicle in the constant curvature radius zone Zit. Accordingly, the maintenance reference point Pca is determined on the basis of the curve shape Rc, the distance Lpa and the point Ce.

The maintenance reference point Pca is set in order to reflect the driver's intention for accelerating the vehicle earlier towards the curve exit after the vehicle speed is maintained at the appropriate vehicle speed Vqo. Additionally, the greater the appropriate vehicle speed Vqo is, the smaller value the distance Lpa is calculated to be, so that the acceleration of the vehicle is prevented from being started at an early stage. As a result, in the case where the vehicle speed is great, the vehicle may be stably driven.

The distance Lpa may be calculated on the basis of either the distance Lit of the constant curvature radius zone Zit or the appropriate vehicle speed Vqo. Furthermore, the distance Lpa may be set as a constant value. Additionally, the maintenance reference point Pca may be set at the point Ce (i.e. the ending point of the zone at which the curvature radius of the curve is maintained to be constant). The point Ce is determined on the basis of the curve shape Rc and the curve position Pc.

In block B5, a distance Lps (see FIG. 3) for determining the acceleration reference point Pcs is calculated on the basis of the appropriate vehicle speed Vqo and a distance Led. The distance Led is a distance of the exit transition curve zone Zcd (see FIG. 3). More specifically, the greater the appropriate vehicle speed Vqo is, the greater value the distance Lps is calculated to be. Additionally, the greater the distance Led is, the greater value the distance Lps is calculated to be.

In block B6, the acceleration reference point Pcs is determined on the basis of the curve position Pc, the curve shape Rc and the distance Lps. The acceleration reference point Pcs is set at a point on the curve positioned closer to the curve exit Cd relative to the point Ce (see FIG. 3) by the distance Lps. The point Ce is the ending point of the zone at which the curvature radius of the curve is maintained to be constant (i.e. the point positioned the farthest from the vehicle in the zone at which the curvature radius is maintained to be constant). Accordingly, the acceleration reference point Pcs is determined on the basis of the curve shape Rc, the distance Lps and the point Ce.

The acceleration reference point Pcs is set in order to avoid an excessive acceleration of the vehicle, so that the vehicle is stably driven in a predetermined zone immediately after the acceleration of the vehicle is allowed towards the curve exit (i.e. in the predetermined zone after the vehicle passes the reference point Pca). Additionally, the greater the appropriate vehicle speed Vqo is, the greater value the distance Lps is calculated to be, so that a distance within which the acceleration of the vehicle is restricted is extended. As a result, in the case where the vehicle speed is great, the stable driving of the vehicle may be achieved. Furthermore, the greater the distance Led is, the greater value the distance Lps is calculated to be. As a result, at a predetermined zone existing closer to the entrance in the exit transition curve zone Zcd, the acceleration of the vehicle is restricted, thereby achieving the stable driving of the vehicle.

The distance Lps may be calculated on the basis of either the distance Led of the exit transition curve zone Zcd or the appropriate vehicle speed Vqo. Furthermore, the distance Lps may be set as a constant value. The maintenance reference point Pca may be set at the point Ce (i.e. the ending point of the zone at which the curvature radius of the curve is maintained to be constant). The point Ce is determined on the basis of the curve shape Rc and the curve position Pc. Described above is the calculation of the reference point in step 545 in FIG. 5.

Referring to FIG. 5 again, a relative distance is calculated in step 550 (i.e. the distance obtaining means) and then, the target vehicle speed is calculated in step 555. The relative distance refers to a relative distance of a zone between the curve and the vehicle (i.e. a relative distance between the curve and the vehicle along the road). A relative distance Lvh# of a zone between the vehicle position Pvh and a reference point Pc# may be calculated as the relative distance. Additionally, the target vehicle speed is a target speed of the vehicle (i.e. an upper limit of the vehicle speed) to be achieved by the curve vehicle speed control. Furthermore, the target vehicle speed Vt relative to the vehicle position Pvh is calculated in step 555.

The symbol "#" is used to comprehensively indicate any one of the reference positions (i.e. the deceleration reference point Pcr, the maintenance reference point Pca and the acceleration reference point Pcs). More specifically, "r" indicates the deceleration reference point, "a" indicates the maintenance reference point and "s" indicates the acceleration reference point. For example, a relative distance Lvhr indicates a distance of a zone between the vehicle position Pvh and the deceleration reference point Pcr.

Detailed processes executed in step 550 and step 555 will be given below with reference to FIG. 8. In block B7, the relative distance Lvhr, which indicates the distance of the zone between the vehicle position Pvh and the reference point Pcr, is calculated on the basis of the vehicle position Pvh and the deceleration reference point Pcr.

In block B8, a first target vehicle speed Vto1 relative to the vehicle position Pvh is calculated on the basis of a characteristic map of the first target vehicle speed Vto1 relative to the distance Lvhr. The first target vehicle speed Vto1 refers to a target vehicle speed to be achieved by the curve vehicle speed control during a period of time until the vehicle reaches the deceleration reference point Pcr. The first target vehicle speed Vto1 is set so as to decrease as the relative distance Lvhr decreases. Furthermore, in a case where the relative distance Lvhr becomes zero (Lvhr=0), the first target vehicle speed Vto1 is calculated as the appropriate vehicle speed Vqo (i.e. the first target vehicle speed Vto1 corresponds to the appropriate vehicle speed Vqo when the vehicle (i.e. the vehicle position Pvh) reaches the deceleration reference point Pcr).

A characteristic of the first target vehicle speed Vto1 may be set so that a decelerating degree of the target vehicle speed Vto1 relative to the position of the vehicle (the distance between the vehicle and the deceleration reference point Pcr) is set as a constant decelerating value Gi (i.e. so that the target vehicle speed Vto1 relative to the position (the distance) is decreased by the constant decelerating value Gi). Additionally, in a case where the vehicle accelerates at a constant value, a changing characteristic of the speed relative to the position (the distance) is to be indicated by a curved line. However, in order to facilitate the explanation, changes in the speed is indicated by a straight line in FIG. 8. The same is applied to the other drawings mentioned below.

In block B9, a relative distance Lvha, which indicates a distance of a zone between the vehicle position Pvh and the maintenance reference point Pca, is calculated on the basis of the vehicle position Pvh and the maintenance reference point Pca. In block B10, a second target vehicle speed Vto2 relative to the vehicle position Pvh is calculated on the basis of a characteristic map of the second target vehicle speed Vto2 relative to the distance Lvha. The second target vehicle speed Vto2 refers to a target vehicle speed to be achieved by the curve vehicle speed control during a period of time between when the vehicle passes the deceleration reference point Pcr and when the vehicle reaches the maintenance reference point Pca. The second target vehicle speed Vto2 is set to be constant without being influenced by the distance Lvha (i.e. Vto2=Vqo).

In block B11, a relative distance Lvhs, which indicates a distance of a zone between the vehicle position Pvh and the acceleration reference point Pcs, is calculated on the basis of the vehicle position Pvh and the acceleration reference point Pcs. In block B12, a third target vehicle speed Vto3 relative to the vehicle position Pvh is calculated on the basis of a characteristic map of the third target vehicle speed Vto3 relative to the distance Lvhs. The third target vehicle speed Vto3 is a target vehicle speed to be achieved by the curve vehicle speed control during a period of time between when the vehicle passes the maintenance reference point Pca and when the vehicle reaches the acceleration reference point Pcs.

The third target vehicle speed Vto3 is calculated so as to correspond to the appropriate vehicle speed (i.e. Vto3=Vqo) in a case where the relative distance Lvhs corresponds to the distance Lps (i.e. Lvhs=Lps), in other words, the third target vehicle speed Vto3 is calculated as the appropriate vehicle speed Vqo when the vehicle reaches the maintenance reference point Pca. Furthermore, the third target vehicle speed Vto3 is set in a manner where the smaller the distance Lvhs becomes, the greater value the third target vehicle speed Vto3 is calculated to be. The characteristic of the third target vehicle speed Vto3 may be set so that an accelerating degree of the third target vehicle speed Vto3 relative to the position (the distance) is set as a constant accelerating value Go (i.e. the third target vehicle speed Vto3 relative to the position (the distance) is decreased by the constant accelerating value Go).

In block B13 (a switching means), either one of the first, second and third target vehicle speeds Vto1, Vto2 and Vto3 is selectively determined as the target vehicle speed Vto on the basis of the vehicle position Pvh and the point Pc#. More specifically, in a case where the vehicle position Pvh is determined at a position closer to the curve entrance than the deceleration reference point Pcr, the first target vehicle speed Vto1 is determined as the target vehicle speed Vto. In a case where the vehicle position Pvh is determined at a position between the deceleration reference point Pcr and the maintenance reference point Pca, the second target vehicle speed Vto2 is determined as the target vehicle speed Vto. Furthermore, in a case where the vehicle position Pvh is determined at a position between the maintenance reference point Pca and the acceleration reference point Pcs, the third target vehicle speed Vto3 is determined as the target vehicle speed Vto. In other words, the target vehicle speed Vto is sequentially switched from the first target vehicle speed Vto1, the second target vehicle speed Vto2 to the third target vehicle speed Vto3 as the vehicle advances. Hence, the point to be referred (i.e. the reference point) for the curve vehicle speed control is sequentially switched from the deceleration reference point Pcr to the maintenance reference point Pca, and from the maintenance reference point Pca to the acceleration reference point Pcs in response to the position of the vehicle.

In block B14, the adjustment vehicle speed Vz is calculated on the basis of the operation quantity Ap of the acceleration operating member AP by the driver, which is obtained by the acceleration operation sensor AS (the acceleration operation quantity obtaining means). More specifically, the adjustment vehicle speed Vz is calculated to be zero (0) in a case where the acceleration operation quantity Ap is equal to or smaller than a predetermined value Apt Furthermore, the adjustment vehicle speed Vz is calculated in a manner where, in a case where the acceleration operation quantity Ap is greater than the predetermined value Apt (i.e. Ap>Ap1), the greater the acceleration operation quantity Ap is, the greater value the adjustment vehicle speed Vz is calculated to be. Additionally, an upper limit value Val may be set at the adjustment vehicle speed Vz, so that the adjustment vehicle speed Vz becomes equal to the upper limit value Vz1 (a predetermined value Vz1) (i.e. Vz=Vz1) in a case where the acceleration operation quantity Ap becomes equal to or greater than a predetermined value Ap2.

In block B15 (an adding means), the target vehicle speed Vt relative to the vehicle position Pvh is calculated by adding the adjustment vehicle speed Vz to the target vehicle speed Vto, which is selected and determined as mentioned above (i.e. Vt=Vto+Vz). Accordingly, because the target vehicle speed Vt is calculated by increasing the target vehicle speed Vto only by the adjustment vehicle speed Vz, which is calculated on the basis of the acceleration operation quantity Ap, the driver's intention of accelerating the vehicle is properly reflected on the curve vehicle speed control. Furthermore, unnecessary acceleration of the vehicle may be avoided by setting the upper limit value Vz1.

An example of a transition of the target vehicle speed Vt relative to the position (the distance) will be described below with reference to FIG. 9. In the example illustrated in FIG. 9, the deceleration reference point Pcr (a first point) is set at a point closer to the curve entrance from the point Cs, which is positioned the closest to the vehicle in the zone in which the curvature radius of the curve is minimum, by the distance Lpr. The maintenance reference point Pca (a second point) is set at a point closer to the curve entrance from the point Ce, which is positioned the farthest from the vehicle in the zone in which the curvature radius of the curve is minimum, by the distance Lpa. Furthermore, the acceleration reference point Pcs (a third point) is set at a point closer to the curve exist from the point Ce by the distance Lps.

The appropriate vehicle speed Vqo is calculated on the basis of the minimum curvature radius Rm of the curve. The first target vehicle speed Vto1, which is the target vehicle speed to be achieved in the case where the vehicle is traveling a near side relative to the point Pcr and approaches the point Pcr, is set with reference to the deceleration reference point Pcr and the appropriate vehicle speed Vqo (a point X in FIG. 9). Furthermore, the first target vehicle speed Vto1 may be set so as to decrease by the constant decelerating degree (i.e. the decelerating value Gi) relative to the position of the vehicle (the distance between the point Pcr and the vehicle).

The second target vehicle speed Vto2, which is the target vehicle speed to be achieved in the zone between the point Pcr and the point Pca, more specifically, in the case where the vehicle approaches the point Pca after passing the point Pcr, is set. The second target vehicle speed Vto2 is set as the constant value (Vto2=the appropriate vehicle speed Vqo) without being influenced by the position of the vehicle (the distance).

Furthermore, the third target vehicle speed Vto3, which is the target vehicle speed to be achieved in the zone between the point Pca and the point Pcs, more specifically in the case where the vehicle approaches the point Pcs after passing the point Pca, is set on the basis of the point Pca, the point Pcs and the appropriate vehicle speed Vqo. The third target vehicle speed Vto3 may be set so as to increase by the constant accelerating degree (i.e. the accelerating value Go) relative to the position of the vehicle (the distance). The characteristic of the target vehicle speed Vto, which is configured with the first, second and third target vehicle speeds Vto1, Vto2 and Vto3, corresponds to the characteristic of the target vehicle speed Vt in the case where the acceleration operation is not performed by the driver (i.e. Ap=0).

The target vehicle speed Vto is adjusted on the basis of the acceleration operation performed by the driver. In other words, the adjustment vehicle speed Vz, which is calculated on the basis of the acceleration operation quantity Ap, is added to the target vehicle speed Vto (the first, second and third target vehicle speeds Vto1, Vto2 and Vto3), so that the target vehicle speed Vt is adjusted so as to increase in response to an increase of the acceleration operation quantity Ap (i.e. Vt=Vto+Vz). The upper limit value Vz1 is set for the adjustment vehicle speed Vz without being influenced by the acceleration operation quantity Ap generated by the driver, so that an upper limit guard (an upper limit characteristic Vtm, which is indicated by a dashed line in FIG. 9) is set for the target vehicle speed Vt.

In the case where the driver does not perform the acceleration operation (i.e. Ap=j), the adjustment vehicle speed Vz is calculated to be zero (Vz=0). Therefore, the target vehicle speed Vt is determined in response to the vehicle speed Pvh while following the characteristic defined by the first, second and third target vehicle speeds Vto1, Vto2 and Vto3. On the other hand, in a case where the driver performs the acceleration operation by which the acceleration operation quantity Ap is maintained to be constant (i.e. in a case where the adjustment vehicle speed Vz calculated on the basis of the acceleration operation quantity Ap is maintained to be constant at a value Vza), the target vehicle speed Vt is determined in response to the vehicle position Pvh while following the characteristic indicated by a thick solid line in FIG. 9 (i.e. a characteristic obtained by upwardly shifting the characteristic defined by the first, second and third target vehicle speeds Vto1, Vto2 and Vto3 by the value Vza). Accordingly, the target vehicle speed Vt is to be adjusted within an area indicated by fine dots in FIG. 9. Described above is the calculation of the relative distance in step 550 (a distance obtaining means) and the calculation of the target vehicle speed in step 555.

Referring to FIG. 5 again, in step 560, it is determined whether or not the curve vehicle speed control is being executed. In a case where the curve vehicle speed control is not being executed, it is determined whether or not a control starting condition is satisfied in step 565. The control starting condition is satisfied in a case where the current vehicle speed Vx exceeds the target vehicle speed Vt relative to the vehicle position Pvh (i.e. the target vehicle speed Vt calculated on the basis of the first target vehicle speed Vto1). In other words, the control starting condition is satisfied in a case where the actual vehicle speed Vx is determined to be greater than the characteristic of the target vehicle position Vt relative to the position (the distance).

Figure 9:
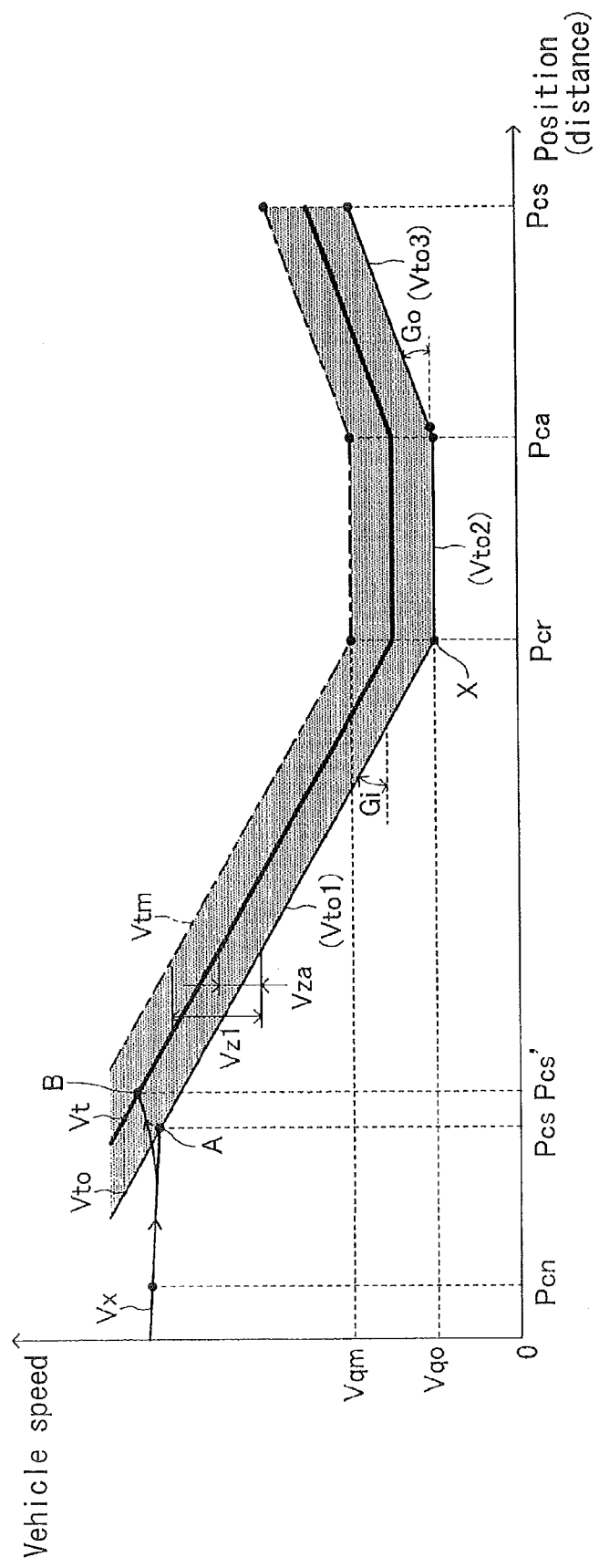
FIG. 9 is a diagram illustrating an example of changes in the target vehicle speed relative to a position (a distance)

For example, in the example illustrated in FIG. 9, in the case where the acceleration operation is not performed (i.e. Ap=0), the curve vehicle speed control is started at the point Pcs, which corresponds to a point A. Furthermore, in the case where the acceleration operation quantity Ap is maintained to be constant (i.e. the appropriate vehicle speed Vz is maintained to be constant at the value Vza), the curve vehicle speed control is started at a point Pcs', which corresponds to a point B.

When the control starting condition is satisfied, the curve vehicle speed control is started and executed in step 570. In the curve vehicle speed control, the current vehicle speed Vx is controlled so as not to exceed the target vehicle speed Vt relative to the vehicle position Pvh.

More specifically, firstly, the vehicle speed Vx of the vehicle is decelerated on the basis of the target vehicle speed Vt, which is calculated on the basis of the first target vehicle speed Vto1 (i.e. Vt=Vto1+Vz). Secondly, when the vehicle position Pvh reaches the point Pcr (i.e. when the vehicle passes the point Pcr), the vehicle speed Vx is adjusted on the basis of the target vehicle speed Vt, which is calculated on the basis of the second target vehicle speed Vto2 (i.e. Vt=Vto2+Vz), in other words, the vehicle speed is maintained to be at the appropriate vehicle speed Vqo in the case where the adjustment vehicle speed Vz is calculated to be zero (0). Then, when the vehicle position Pvh reaches the point Pca (i.e. when the vehicle passes the point Pca), the acceleration of the vehicle is restricted towards the curve exit on the basis of the target vehicle speed Vt, which is calculated on the basis of the third target vehicle speed Vto3 (i.e. Vt=Vto3+Vz).

Accordingly, in step 575, it is determined whether or not a control ending condition is satisfied while a curve deceleration control is being executed. The control ending condition is satisfied in the case where the vehicle position Pvh reaches the point Pcs (i.e. when the vehicle passes the point Pcs). In the case where the control ending condition is satisfied, the curve vehicle speed control is ended. In other words, the restriction of the acceleration is cancelled, so that the vehicle turns to be in a normal driving condition (i.e. a state where the vehicle is accelerated and decelerated in response to the acceleration operation and the deceleration operation).

Figure 10:
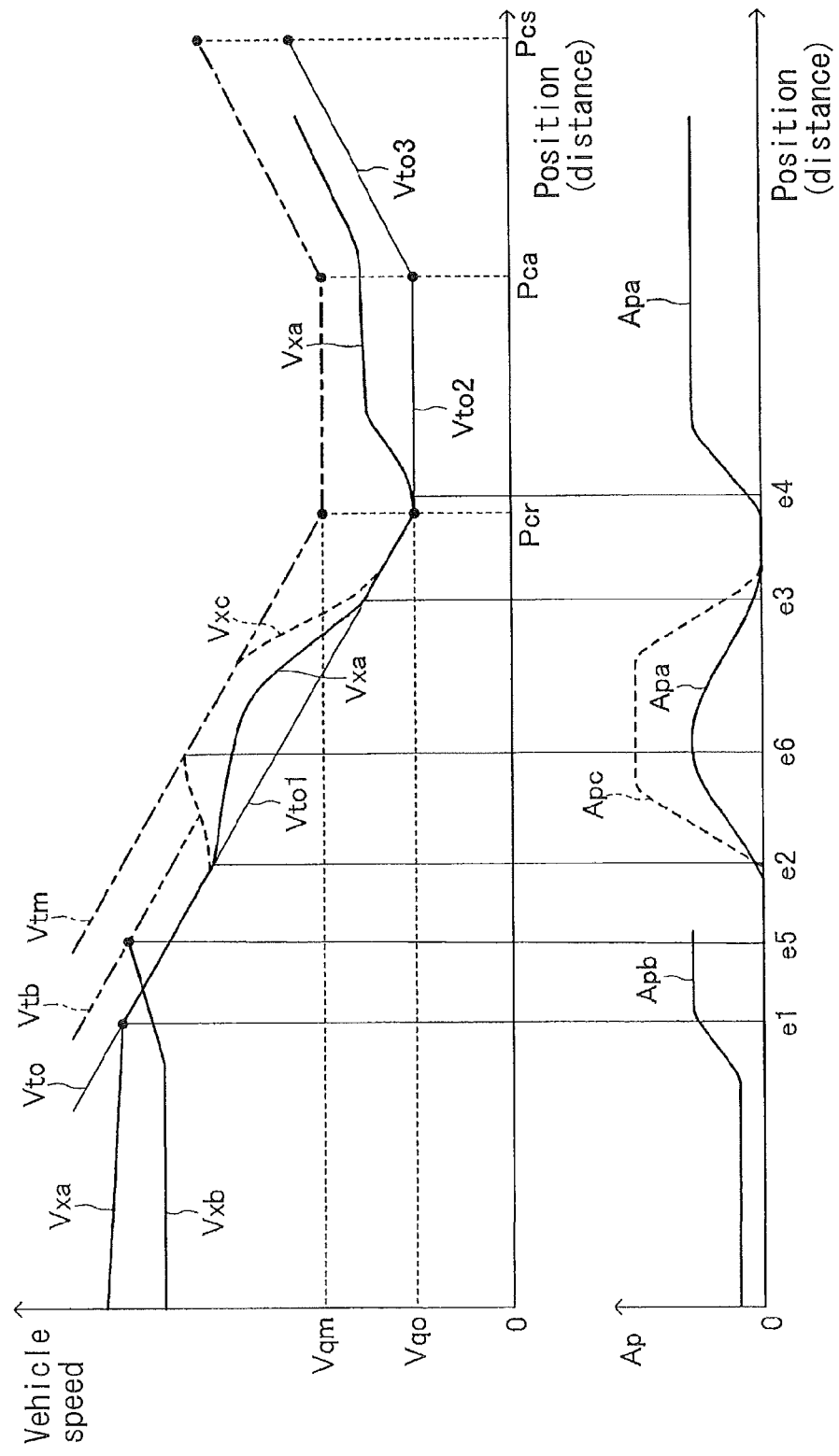
FIG. 10 is a diagram illustrating an example of vehicle speed changes, which are generated by the curve vehicle speed control in a case where various acceleration operations are performed by a driver.

An example of changes in the vehicle speed in cases where various acceleration operations are performed by the driver will be described below with reference to FIG. 10.

<A Case where the Acceleration Operation Quantity Ap is Increased/Decreased by the Driver While the Control is Being Executed>

Firstly, a case where the driver increases/decreases the acceleration operation quantity Ap as indicated by an acceleration operation characteristic Apa while the vehicle is traveling through the curve will be described below. In this case, the changes in the vehicle speed correspond to changes in vehicle speed Vxa.

More specifically, the curve vehicle speed control is started when the vehicle speed Vx at the vehicle position exceeds the target vehicle speed Vt (which is equal to the target vehicle speed Vto because the acceleration operation is not performed) at a point e1. The vehicle is decelerated on the basis of the characteristic of the target vehicle speed Vt (=Vto). When the driver starts the acceleration operation and the acceleration operation quantity Ap exceeds the predetermined value Ap1 at a point e2, the target vehicle speed Vt is adjusted so as to increase relative to the target vehicle speed Vto on the basis of the acceleration operation quantity Ap (i.e. the adjustment vehicle speed Vz). A degree of a deceleration of the vehicle speed Vxa is reduced in response to a reduction of a degree of reducing the target vehicle speed Vt.

When the driver starts releasing the acceleration pedal AP, the adjustment vehicle speed Vz is calculated to be a smaller value, so that the target vehicle speed Vt is adjusted to approximate to the target vehicle speed Vto. When the acceleration operation quantity Ap becomes lower than the predetermined value Ap1 at a point e3, the target vehicle speed Vt corresponds to the target vehicle speed Vto again. As a result, the vehicle speed Vxa is again adjusted on the basis of the characteristic of the target vehicle speed Vt (=Vto).

When the driver starts the acceleration operation and the acceleration operation quantity Ap again exceeds the predetermined value Ap1 at a point e4 in the zone between the point Pcr and the point Pca (i.e. a vehicle speed maintaining zone), the target vehicle speed Vto is again adjusted so as to increase the target vehicle speed Vt on the basis of the acceleration operation quantity Ap (i.e. the adjustment vehicle speed Vz). The increase of the vehicle speed is allowed in response to the increase of the target vehicle speed Vt, so that the vehicle speed Vxa increases.

<A Case where the Driver Performs the Acceleration Operation Before the Control is Started>

A case where the driver performs the acceleration operation before the curve vehicle speed control is started, so that the acceleration operation quantity Ap indicates a value greater than zero (0), as indicated by an acceleration operation characteristic Apb, will be described here. In this case, the changes in the vehicle speed correspond to changes in a vehicle speed Vxb.

In this case, the target vehicle speed Vt is increased by the adjustment vehicle speed Vz from the target vehicle speed Vto on the basis of the acceleration operation quantity Ap, in order to obtain a target vehicle speed Vtb. The curve vehicle speed control is started at a point e5 at which the vehicle speed Vxb exceeds the target vehicle speed Vtb. When the curve acceleration control is started, the vehicle speed Vxb is decreased on the basis of a characteristic of the target vehicle speed Vtb.

<A Case where the Driver Performs a Large Acceleration Operation>

A case where the driver performs a large acceleration operation while the curve vehicle speed control is being executed, as indicated by an acceleration operation characteristic Apc (which is indicated by a broken line), will be described below. In this case, the changes in the vehicle speed correspond to changes in a vehicle speed Vxc (which is indicated by a broken line).

Figure 8:
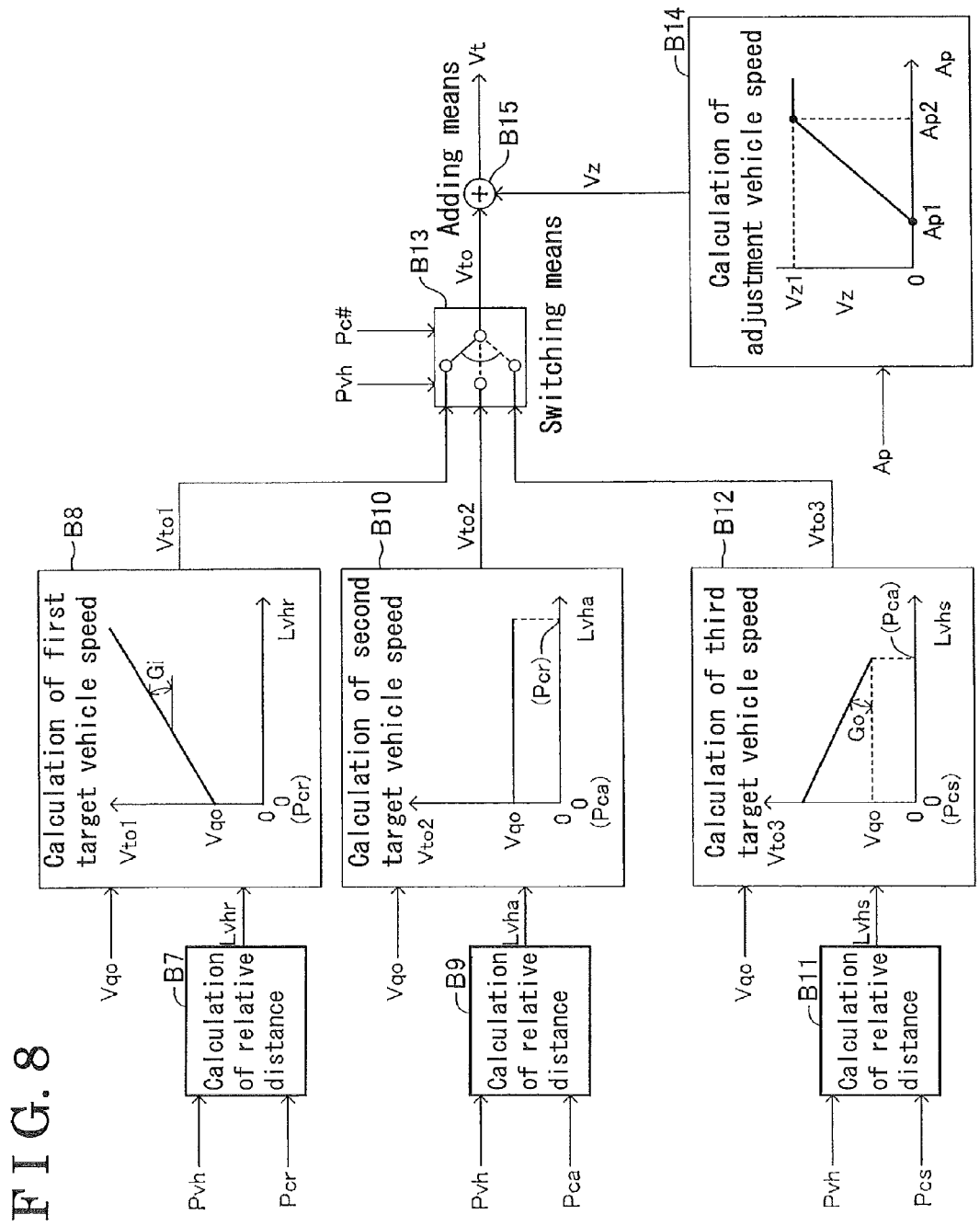
FIG. 8 is a functional block diagram for explaining a detailed process of calculations executed by the device illustrated in FIG. 1 in order to obtain a relative distance and a target vehicle speed.

As indicated by the acceleration operation characteristic Apc, in a case where the acceleration operation quantity Ap is remarkably great, the adjustment vehicle speed Vz is restricted at the upper limit value Vz1 (see FIG. 8). While the adjustment vehicle speed Vz is restricted by the upper limit value Vz1 (i.e. while the adjustment vehicle speed Vz is maintained to be at the upper limit value Vz1), the characteristic of the target vehicle speed Vt is maintained to be the upper limit characteristic Vtm. The increase of the vehicle speed is allowed in response to the increase of the target vehicle speed Vt at a zone until the target vehicle speed Vt reaches the upper limit characteristic Vtm at a point e6, so that the vehicle speed Vxc increases. In other words, the acceleration of the vehicle is allowed even if the vehicle travels at the deceleration zone of the curve vehicle speed control (i.e. a zone between a point where the control is started and the point Pcr). Additionally, even in the case where the acceleration operation quantity Ap is remarkably great, the vehicle speed is not likely to exceed the upper limit characteristic Vtm because the upper limit characteristic Vtm is set independently of (without being influenced by) the acceleration operation quantity Ap.

According to the speed control device of the embodiment, the target vehicle speed Vto in the case where the driver does not perform the acceleration operation (the acceleration operation quantity Ap=0) is determined on the basis of the characteristic defined by the first, second and third target vehicle speeds Vto1, Vto2 and Vto3 in the curve vehicle speed control. The first target vehicle speed Vto1 has the characteristic in which the first target vehicle speed Vto1 decreases by the decelerating value Gi (e.g. a constant value) until the vehicle reaches the point Pcr and corresponds to the appropriate vehicle speed Vqo when the vehicle reaches the point Pcr. The second target vehicle speed Vto2 has the characteristic in which the second target vehicle speed Vto2 is maintained to be at the appropriate vehicle speed Vqo from the point Pcr to the point Pca. The third target vehicle speed Vto3 has the characteristic in which the third target vehicle speed Vot3 increases by the accelerating value Go (e.g. a constant value) from the point Pca to the point Pcs. The adjustment vehicle speed Vz is calculated on the basis of the acceleration operation quantity Ap generated by the driver, so that the adjustment vehicle speed Vz is added to the target vehicle speed Vto in order to obtain the target vehicle speed Vt (i.e. Vt=Vto+Vz). Then, the vehicle speed is adjusted so as not to exceed the target vehicle speed Vt relative to the vehicle position.

Accordingly, because the acceleration operation quantity Ap is taken into account for the calculation of the target vehicle speed Vt, the driver's intention of accelerating the vehicle is reflected to the curve vehicle speed control over the entire zone of the curve (i.e. the zone between the point where the curve vehicle speed control is started and the point where the curve vehicle speed control is ended). Therefore, the driver may feel less discomfort. Specifically, the acceleration of the vehicle is allowed even at the decelerating zone of the curve vehicle speed control (i.e. the zone between the control starting point and the point Pcr), or at the vehicle speed maintaining zone (i.e. the zone between the point Pcr and the point Pca). Therefore, the curve vehicle speed control may coincide with a feeling of the driver. Furthermore, because the upper limit characteristic Vtm is set for the target vehicle speed Vt, unnecessary acceleration of the vehicle may be avoided, so that the vehicle may stably travel through the curve.

The present invention is not limited to the above-described configuration. For example, various changes and modification may be applied to the speed control device, without departing from the spirit of the present invention. For example, in the embodiment, the adjustment vehicle speed Vz when the acceleration operation is performed is calculated on the basis of the acceleration operation quantity Ap, so that the adjustment vehicle speed Vz is added to the target vehicle speed Vto (the target vehicle speed Vto when the acceleration operation quantity Ap is zero (0)) in order to obtain the target vehicle speed Vt (see FIG. 8). Alternatively, the adjustment of the target vehicle speed Vto to obtain the target vehicle speed Vt may be executed by adding an adjustment vehicle speed Vqz to the appropriate vehicle speed Vqo.

Figure 11:
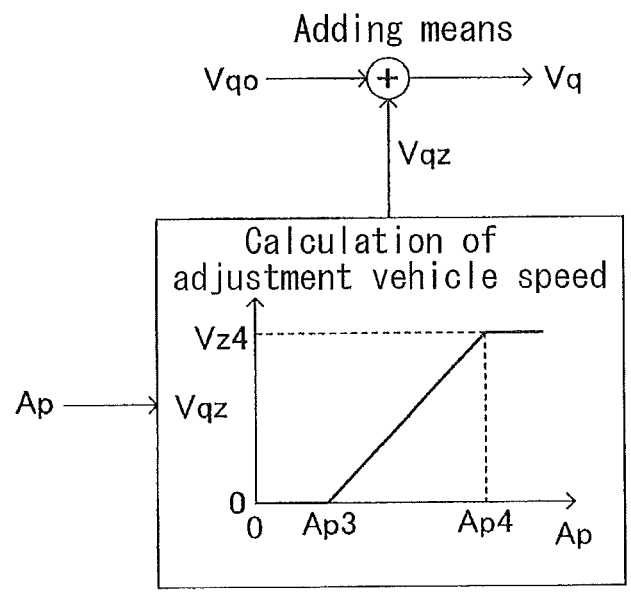
FIG. 11 is a functional block diagram for explaining a calculation process in a case where a target vehicle speed, which is obtained by adjusting an appropriate vehicle speed and into which the acceleration operation to be performed by a driver is taken into account, is determined by a speed control device for a vehicle according to a modified example of the embodiment.

More specifically, the adjustment vehicle speed Vqz is calculated on the basis of the acceleration operation quantity Ap, which is generated when the driver operates the acceleration pedal AP, as illustrated in FIG. 11. In a case where the acceleration operation quantity Ap is equal to or smaller than a value Ap3 (a predetermined value), the adjustment vehicle speed Vqz is calculated to be zero (0). On the other hand, in case where the acceleration operation quantity Ap is greater than the value Ap3, the adjustment vehicle speed Vqz is calculated in the manner where the greater the acceleration operation quantity Ap is, the greater value the adjustment vehicle speed Vqz is calculated to be. Furthermore, an upper limit may be set for the adjustment vehicle speed Vqz, so that the adjustment vehicle speed Vqz is maintained to be at a value Vz4 (a predetermined value) in a case where the acceleration operation quantity Ap becomes equal to or greater than the value Ap4 (the predetermined value). The adjustment vehicle speed Vqz, which is calculated as mentioned-above, is added to the appropriate vehicle speed Vqo in order to obtain the appropriate vehicle speed Vq (Vq=Vqo+Vqz).

In the above-described embodiment, the target vehicle speed Vto is set on the basis of the appropriate vehicle speed Vqo, as illustrated in FIG. 9. Alternatively, in this case, the target vehicle speed Vt is set on the basis of an appropriate vehicle speed Vq, in which the acceleration operation is taken into account (i.e. Vq=Vqo+Vqz), instead of the appropriate vehicle speed Vqo. In other words, because the appropriate vehicle speed Vq is adjusted so as to increase from the appropriate vehicle speed Vqo in response to the acceleration operation quantity Ap, similar advantages and effects mentioned above are achievable. Furthermore, by setting an upper limit value Vz4 to the adjustment vehicle speed Vqz, unnecessary acceleration of the vehicle may be avoidable as is the case with the above-described embodiment.

In the above-described embodiment and the modified example of the embodiment, as illustrated in FIGS. 8 and 11, the acceleration operation quantity Ap is taken into account while the curve vehicle speed control is executed because the adjustment vehicle speed Vz and the adjustment vehicle speed Vqz are added to the target vehicle speed Vto and the appropriate vehicle speed Vqo, respectively. Alternatively, the acceleration operation quantity Ap may be taken into account while the curve vehicle speed control is executed by multiplying the target vehicle speed Vto or the appropriate vehicle speed Vqo by an adjustment coefficient Kvz instead of adding the adjustment vehicle speed Vz and the adjustment vehicle speed Vqz to the target vehicle speed Vto and the appropriate vehicle speed Vqo, respectively.

Figure 12:
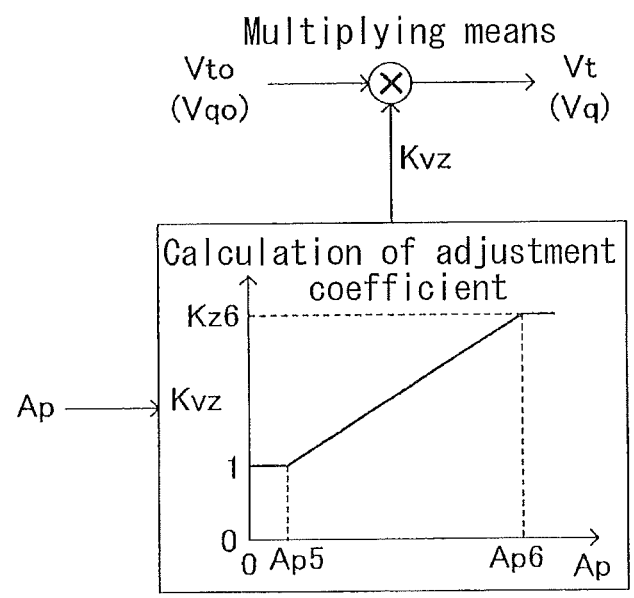
FIG. 12 is a functional block diagram for explaining a calculation process in a case where a target vehicle speed, which is obtained by using an adjustment coefficient used when the acceleration operation is performed by the driver and into which the acceleration operation by the driver is taken into account, is determined by a speed control device for a vehicle according to another modified example of the embodiment.

More specifically, as illustrated in FIG. 12, the adjustment coefficient Kvz ($\geqq 1$) when the acceleration operation is performed is calculated on the basis of the acceleration operation quantity Ap. The adjustment coefficient Kvz is calculated to be one (1) in a case where the acceleration operation quantity Ap is equal to or smaller than a value Ap5 (a predetermined value). Furthermore, the adjustment coefficient Kvz is calculated so as to increase in response to the increase of the acceleration operation quantity Ap in a case where the acceleration operation quantity Ap is greater than the value Vp5. Moreover, the adjustment coefficient Kvz is maintained to be at an upper limit value Kz6 in a case where the acceleration operation quantity Ap is greater than a value Ap6 (a predetermined value), so that the upper limit characteristic Vtm is also set for the target vehicle speed Vt as is the case with the above-described embodiment. Even in this case, similar advantages and effects may be achievable as is the case where the acceleration operation quantity Ap is taken into account by adding the adjustment vehicle value Vz and the adjustment vehicle value Vqz to the target vehicle speed Vto and the appropriate vehicle speed Vqo, respectively.

In the case where the appropriate vehicle speed Vqo is adjusted on the basis of the acceleration operation quantity Ap (i.e. in the case where the adjustment vehicle speed Vqz is added to the appropriate vehicle speed Vqo or in the case where the appropriate vehicle speed Vqo is multiplied by the adjustment coefficient Kvz), first, second and third target vehicle speeds Vt1, Vt2 and Vt3 are calculated on the basis of the adjusted appropriate vehicle speed Vq and the distance Lvh#. Then, either one of the first, second and third target vehicle speeds Vt1, Vt2 and Vt3 is selectively determined as the target vehicle speed Vt. More specifically, the switching means determines either one of the first, second and third target vehicle speeds Vt1, Vt2 and Vt3 as the target vehicle speed Vt on the basis of the vehicle position Pvh and the point Pc#.

Furthermore, in the above-described embodiment, the distance Lvh# is calculated on the basis of the vehicle position Pvh and the reference point Pc#, so that the curve vehicle speed control is executed on the basis of the distance Lvh# while sequentially switching the reference point Pc# as the vehicle position Pvh advances (see FIG. 8). Alternatively, as illustrated in FIG. 9, the characteristic of the target vehicle speed Vt relative to the position (a point) of the vehicle on the curve may be set on the basis of the reference point Pc#, so that the curve vehicle speed control is executed on the basis of the target vehicle speed Vt relative to the vehicle position Pvh, without calculating the distance Lvh#.

Additionally, the distance Lvh# (the positional relationship) between the vehicle position Pvh and a point may be converted into a time Tvh# (an arrival time) on the basis of the vehicle speed Vx. Hence, the characteristic used in the above-described embodiment (see FIGS. 8 and 9) may be displaced by a characteristic about the time Tvh# instead of the distance Lvh#. For example, the target vehicle speed Vto may be used as the characteristic relative to the time Tvh#, which corresponds to a period of time until the vehicle reaches the reference point Pc# from the vehicle position Pvh. In this case, the curve vehicle speed control is executed on the basis of the arrival time Tvh#, which is calculated on the basis of the vehicle speed Vx and the relative positional relationship (the distance) between the vehicle position Pvh and the curve position Pc. Additionally, the symbol "#" comprehensively indicates the reference points, more specifically, "r" indicates the deceleration reference point, "a" indicates the maintenance reference point and "s" indicates the acceleration reference point. In other words, the symbol "#" indicates a connection with either one of the deceleration reference point Pcr, the maintenance reference point Pca and the acceleration reference point Pcs.

In the above-described embodiment, the navigation device is used. Alternatively, the relative position between the vehicle and the curve and the curvature radius of the curve may be obtained on the basis of an image captured by a camera, which is provided at the vehicle. More specifically, the distance between the vehicle and the curve and the curvature radius of the curve may be obtained in a manner where: firstly, a line (e.g. a white line) on the road or an edge of the road are detected on the basis of the image captured by, for example, a stereo camera provided at the vehicle; secondly, a distance distribution on the entire image is calculated on the basis of displacement of positions of the identical object on the stereo images and on the basis of the principle of the triangulation; and finally, the distance between the vehicle and the curve and the curvature radius of the curve are obtained on the basis of the calculation result.

Furthermore, the speed control device according to the embodiment and the modified examples may be adapted to a constant speed control (i.e. an auto cruise control). In this case, the vehicle is controlled so as to move at a constant speed (i.e. a set vehicle speed Vs), which is set by the driver. Then, when the curve is recognized ahead of the vehicle, the vehicle is automatically decelerated on the basis of the characteristic of the first target vehicle speed Vto1 from when the vehicle speed Vx exceeds the first target vehicle speed Vto1 relative to the vehicle speed until the vehicle reaches the reference point Pcr. Then, when the vehicle passes the reference point Pcr, the vehicle speed Vx is maintained to be a constant vehicle speed (the appropriate vehicle speed Vqo), by which the vehicle is properly and stably travel through the curve, on the basis of the second target vehicle speed Vto2. When the vehicle passes the reference point Pca, the vehicle is again accelerated on the basis of the third target vehicle speed Vto3 until the vehicle speed Vx reaches the set vehicle speed Vs. Accordingly, in the case where the speed control device is used for the constant speed control, the acceleration control for accelerating the vehicle again up to the set vehicle speed Vs is executed instead of the above-described acceleration restricting control (i.e. the control executed from the point Pca and the point Pcs).

Accordingly, in the case where the speed control device is used for the constant speed control, the target vehicle speed Vto (the first, second and third target vehicle speeds Vt1o, Vto2 and Vto3) is adjusted so as to increase in response to the acceleration operation quantity Ap in the similar manner as described above when the driver performs the acceleration operation, so that the vehicle speed is controlled on the basis of the target vehicle speed Vt, which is obtained by adjusting the target vehicle speed Vto. As a result, the acceleration operation performed by the driver is taken into account while the constant speed control is executed, the driver may feel less discomfort.

Additionally, in the case where the speed control device includes the constant speed control (i.e. the auto cruise control), the vehicle speed controlling means A4 controls the vehicle speed Vx so as to correspond to the target vehicle speed Vt. On the other hand, in a case where the speed control device does not include the constant speed control (i.e. the auto cruise control), the vehicle speed controlling means A4 controls the vehicle speed Vx so as not to exceed the target vehicle speed Vt (with the target vehicle speed as the upper limit value).

Figure 13:
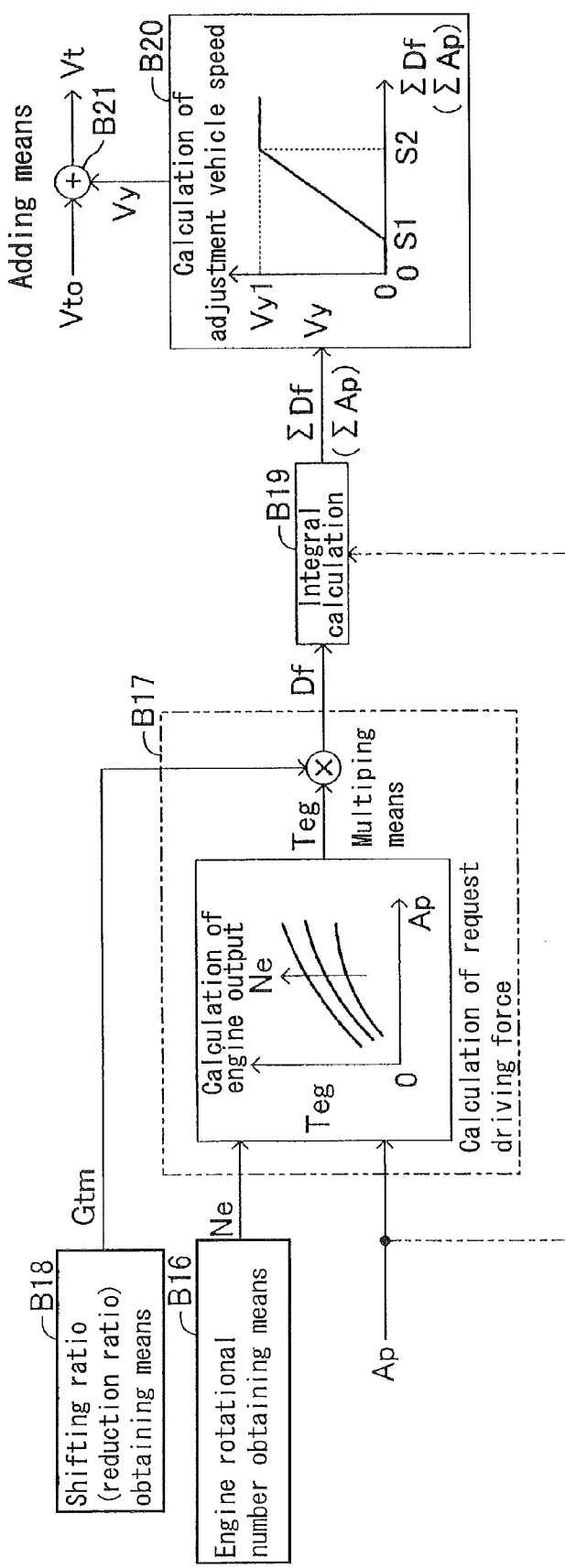
FIG. 13 is a functional block diagram for explaining a calculation process in a case where a target vehicle speed is determined by a speed control device for a vehicle according to a further modified example of the embodiment calculating an adjustment vehicle speed, which is obtained by converting a required driving force of the vehicle by a driver into a vehicle speed, so that the acceleration operation by the driver is taken into account in the target vehicle speed.

Alternatively, as illustrated in FIG. 13, an adjustment vehicle speed Vy may be calculated in the manner where a driving force, which is required by the driver and which is to be acted on the vehicle, is estimated, and then, the estimated driving force is converted into the vehicle speed. More specifically, the engine output Teg (i.e. the engine output required by the driver) is calculated in block B17 on the basis of the acceleration operation quantity Ap and the engine rotational speed Ne, which is obtained in block B16 (i.e. an engine rotational number obtaining means, the engine rotational speed sensor NE). The engine output Teg is multiplied by a reduction ratio Gtm, which is obtained in block B18 (i.e. a shifting ratio (reduction ratio) obtaining means) in order to calculate a driving force Df, which is required by the driver. An integration process is executed to the driving force Df in block B19. Then, the adjustment vehicle speed Vy is calculated by using a calculation map, which is similar to the calculation map used for calculating the adjustment vehicle speed Vz in FIG. 8, on the basis of the integration result ΣDf in block B20. As is the case with the adjustment vehicle speed Vz, an upper limit value Vy1 is set for the adjustment vehicle speed Vy. Then, in block B21 (an adding means), the adjustment vehicle speed Vy is added to the target vehicle speed Vto in order to obtain the target vehicle speed Vt (Vt=Vto+Vy).

Alternatively, the adjustment vehicle speed Vy may be calculated on the basis of an integration result ΣAp, which is obtained by executing the integration process directly to the acceleration operation quantity Ap, without estimating the driving force as mentioned above. This alternative is achievable (valid) because the acceleration operation quantity Ap is a quantity (a property) indicating the driver's intention of acceleration.

Figure 14:
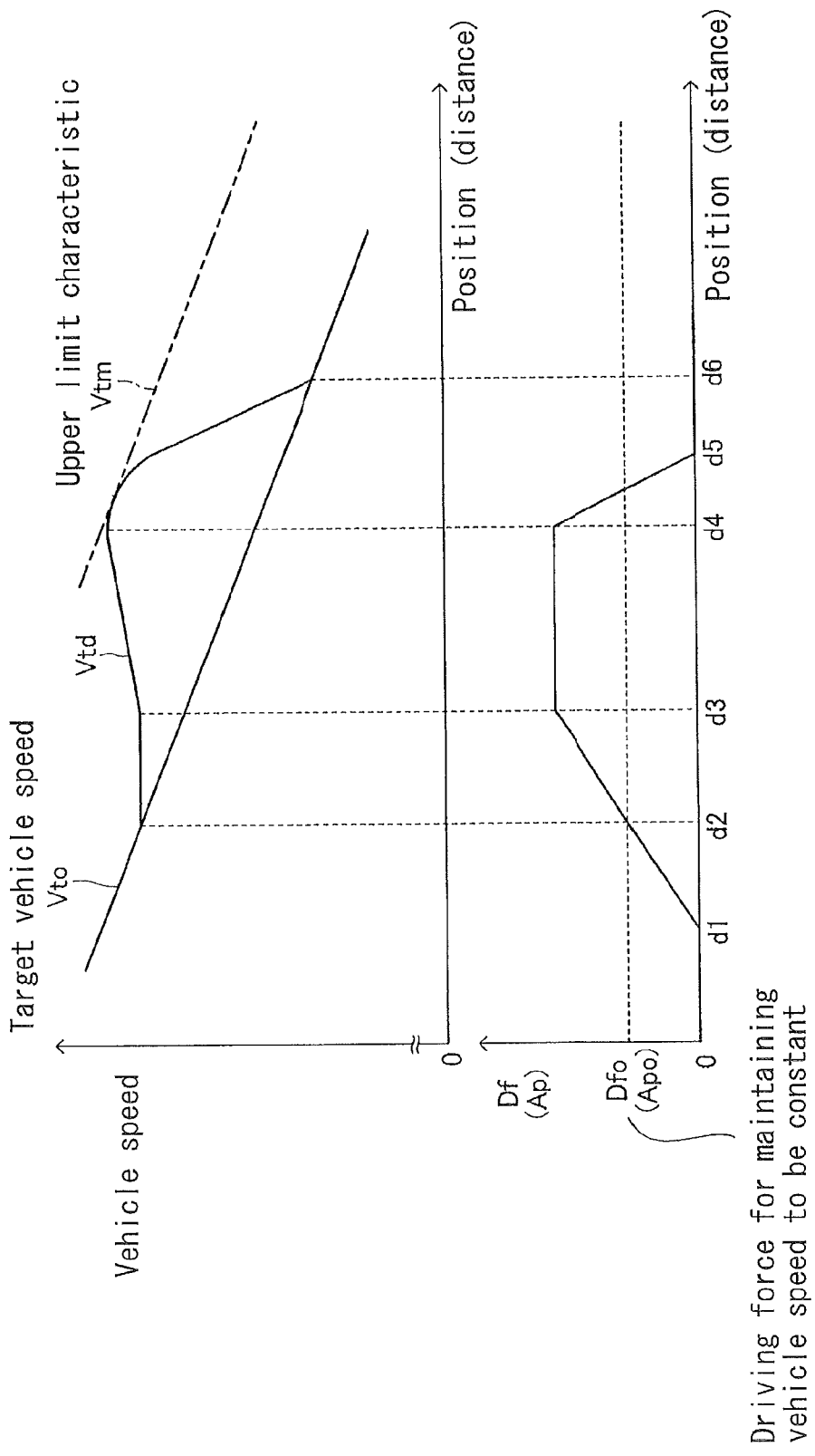
FIG. 14 is a diagram illustrating an example of vehicle speed changes, which occur when the curve vehicle speed control is executed on the basis of the calculation process illustrated in FIG. 13.

As illustrated in FIG. 14, a driving force Dfo (or, an acceleration operation quantity Apo), by which the vehicle speed is maintained to be constant relative to the driving force Df (or the acceleration operation quantity Ap) while offsetting a running resistance (a resistance to travel) (i.e. while balancing against the running resistance), is determined. The driving force Dfo and the acceleration operation quantity Apo may be experimentally and preliminarily obtained. When the driving force Df (or the acceleration operation quantity Ap) exceeds the driving force Dfo (or the acceleration operation quantity Apo), the above-described integral calculation is started (see a point d2). The target vehicle speed Vy is calculated on the basis of the driving force integrated value ΣDf (or the acceleration operation quantity integrated value ΣAp), and then, the target vehicle speed Vy is added to the target vehicle speed Vto. The target vehicle speed Vt (Vt=Vto+Vy, which is indicated as Vtd in FIG. 14) is increased relative to the target vehicle speed Vto. Therefore, the deceleration of the vehicle is eased in response to the acceleration operation quantity Ap or the acceleration of the vehicle is allowed in response to the acceleration operation quantity Ap. As a result, the driver may feel less discomfort. Additionally, the upper limit characteristic Vtm is defined by the upper limit value Vy1 (see FIG. 13). The vehicle speed Vx is guarded (restricted) by the upper limit characteristic Vtm, so that the vehicle stably travels through the curve even if the acceleration operation is performed while the vehicle is traveling through the curve.

For example, in FIG. 8 and the like, the adjustment of the target vehicle speed on the basis of the acceleration operation quantity Ap (i.e. the addition of the adjustment vehicle speed Vz to the target vehicle speed Vto, the addition of the adjustment vehicle speed Vy to the target vehicle speed Vto, the multiplication of the target vehicle speed Vto by the adjustment coefficient Kvz) is executed to the target vehicle speed Vto, which is selected in block B13 (the switching means). Alternatively, the first, second and third target vehicle speeds Vt1, Vt2 and Vt3 may be calculated relative to the respective first, second and third target vehicle speeds Vto1, Vto2 and Vto3 in view of the acceleration operation quantity Ap, so that either one of the first, second and third target vehicle speeds Vt1, Vt2 and Vt3, which are obtained by adjusting the respective first, second and third target vehicle speeds Vto1, Vto2 and Vto3, is selectively determined as the target vehicle speed Vt. More specifically, the first, second and third target vehicle speed Vt1, Vt2 and Vt3 may be calculated by adding the adjustment vehicle speed Vz or the adjustment vehicle speed Vy to the first, second and third target vehicle speeds Vto1, Vto2 and Vto3, respectively. Alternatively, the first, second and third target vehicle speeds Vt1, Vt2 and Vt3 may be calculated by multiplying the respective first, second and third target vehicle speeds Vto1, Vto2 and Vto3 by the adjustment coefficient Kvz. The switching means determines either one of the first, second and third target vehicle speeds Vt1, Vt2 and Vt3 as the target vehicle speed Vt on the basis of the vehicle position Pvh and the point Pc#.

The speed control device for the vehicle according to the embodiment includes the vehicle speed obtaining means (A5, 515) for obtaining the speed (Vx) of the vehicle, the shape obtaining means (530) for obtaining the shape (Rc, Rm) of the curve existing ahead of the vehicle, the position obtaining means (520, 525) for obtaining the positional relationship (Pc, Pvh) between the curve and the vehicle, and the target vehicle speed determining means (A1, A2, A3) for determining the target vehicle speed (Vqo, Vq, Vto, Vt) to be achieved in the case where the vehicle travels through the curve on the basis of the curve shape (Rc, Rm) and the positional relationship (Pc, Pvh).

The speed control device for the vehicle according to the embodiment may be modified so as to include the reference determining means (540, 545) for determining the appropriate vehicle speed (Vqo, Vq), by which the vehicle properly travels through the curve, and the reference point (Pcr), which exists on the curve and which is the reference point by which the vehicle speed is decelerated down to the appropriate vehicle speed (Vqo, Vq), on the basis of the shape (Rc, Rm) of the curve, and the distance obtaining means (550) for obtaining the relative distance (Lvhr) of the zone between the reference point (Pcr) and the vehicle, instead of the position obtaining means (520, 525). The appropriate vehicle speed (Vqo, Vq) may be determined on the basis of the minimum curvature radius of the curve. The reference point (Pcr) refers to, for example, the starting point of the zone at which the vehicle speed (Vx) is maintained to be at the appropriate vehicle speed (Vqo, Vq). In this case, the target vehicle speed determining means (A1, A2, A3) is configured so as to determine the target vehicle speed (Vto, Vt) for decreasing the speed (Vx) of the vehicle down to the appropriate vehicle speed (Vqo, Vq) on the basis of the reference point (Pcr), the appropriate vehicle speed (Vqo, Vq) and the relative distance (Lvhr).

The control device for the vehicle according to the embodiment further includes the vehicle speed controlling means (A4) for controlling the speed (Vx) of the vehicle on the basis of the target vehicle speed (Vto, Vt) and the vehicle speed (Vx). The vehicle speed (Vx) may be controlled so as not to exceed the target vehicle speed (Vto, Vt) (with the target vehicle speed as the upper limit value) even in the case where the vehicle speed (Vx) is controlled so as to correspond to the target vehicle speed (Vto, Vt).

The control device for the vehicle according to the embodiment further includes the acceleration operation quantity obtaining means (AS) for obtaining the operation quantity (Ap) (an operating amount) of the acceleration operating member (AP), which is to be operated by the driver of the vehicle. The target vehicle speed determining means (A1, A2, A3) includes the modification means (A3) for modifying the target vehicle speed (Vqo, Vq, Vto, Vt) on the basis of the acceleration operation quantity (Ap) in the manner where the target vehicle speed (Vq, Vt) in the case where the acceleration operation quantity (Ap) is greater than zero (0) is adjusted to be a greater value than the target vehicle speed (Vqo, Vto) in the case where the acceleration operation quantity (Ap) is zero (0).

In this case, the greater the acceleration operation quantity (Ap) is, the greater value the target vehicle speed (Vq, Vt) is determined to be. Furthermore, the modification means (A3) is configured so as to modify the target vehicle speed (Vqo, Vq, Vto, Vt) in a manner where the target vehicle speed (Vq, Vt) in the case where the operation quantity (Ap) is greater than zero (0) becomes a greater value than the target vehicle speed (Vqo, Vto) in the case where the operation quantity (Ap) is zero (0) over the entire zone of the curve (i.e. the zone between the point where the speed control is started and the point where the speed control is ended, the zone between the curve entrance and the curve exit).

Accordingly, in the case where the driver performs the acceleration operation while the vehicle travels through the curve, the target vehicle speed (i.e. the actual vehicle speed) may be increased when comparing to the target vehicle speed in the case where the acceleration operation is not performed. Therefore, the acceleration operation performed by the driver is reflected in the vehicle speed control over the entire zone of the curve. Accordingly, the smooth speed control may be achieved over the entire zone of the curve in response to the driver's intention of the acceleration of the vehicle, so that the driver may feel less discomfort.

According to the embodiment, the speed control device is configured so as to determine the target vehicle speed (Vt) on the basis of the operation quantity (Ap), so that the target vehicle speed (Vt) is allowed to be increased at the zone, at which the curvature radius of the curve gradually decreases (i.e. the advance transition curve zone Zci). The zone at which the curvature radius gradually decreases on the curve refers to the zone existing closer to the curve entrance relative to, for example, the reference point.

Generally, there may exist a zone at which the driver particularly wishes to accelerate the vehicle while the vehicle travels in the zone, which starts from the vicinity of the curve entrance and at which the curvature radius of the curve gradually decreases, depending on a driving condition. According to the speed control device of the embodiment, the acceleration of the vehicle is restricted in the above-mentioned condition, while the vehicle is accelerated rather than decelerated. Therefore, the driver may feel further less discomfort while the vehicle travels in the zone at which the curvature radius of the curve gradually decreases.

The speed control device according to the embodiment is configured so that the target vehicle speed (Vt) is determined while the increase of the target vehicle speed from the value obtained in the case where the operation quantity (Ap) is zero (0) is controlled so as not to exceed the preliminarily set upper limit (Vz1, Vz4, Kz6, Vy1). Accordingly, the vehicle is not likely to be unnecessarily accelerated while the vehicle travels through the curve, which allows the vehicle to stably travel through the curve.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A speed control device for a vehicle comprising:
a vehicle speed obtaining means for obtaining a speed of the vehicle;
a shape obtaining means for obtaining a shape of a curve existing ahead of the vehicle;
a position obtaining means for obtaining a positional relationship between the curve and the vehicle;
a target vehicle speed determining means for determining a target vehicle speed in a case where the vehicle travels through the curve, on the basis of the shape of the curve and the positional relationship;
a vehicle speed controlling means for controlling the speed of the vehicle on the basis of the target vehicle speed and the speed of the vehicle; and
an acceleration operation quantity obtaining means for obtaining an operation quantity of an acceleration operating member, which is to be operated by a driver of the vehicle, wherein
the target vehicle speed determining means includes a modification means for modifying the target vehicle speed on the basis of the operation quantity so that the target vehicle speed in a case where the operation quantity is greater than zero becomes a greater value than the target vehicle speed in a case where the operation quantity is zero, wherein the modification means starts modifying the target vehicle speed when the operation quantity exceeds a predetermined value which is greater than zero.

2. The speed control device for the vehicle according to claim 1, wherein the target vehicle speed determining means determines the target vehicle speed on the basis of the operation quantity so that an increase of the target vehicle speed is allowed at a zone at which a curvature radius of the curve gradually decreases.

3. The speed control device for the vehicle according to claim 2, wherein the target vehicle speed determining means determines the target vehicle speed in a manner where the greater the operation quantity is, the greater value the target vehicle speed is determined to be.

4. The speed control device for the vehicle according to claim 2, wherein the target vehicle speed determining means determines the target vehicle speed so that an increase of the target vehicle speed from a value obtained in the case where the operation quantity is zero does not exceed an upper limit, which is preliminarily set.

5. The speed control device for the vehicle according to claim 3, wherein the target vehicle speed determining means determines the target vehicle speed so that an increase of the target vehicle speed from a value obtained in the case where the operation quantity is zero does not exceed an upper limit, which is preliminarily set.

6. The speed control device for the vehicle according to claim 1, wherein the target vehicle speed determining means determines the target vehicle speed in a manner where the greater the operation quantity is, the greater value the target vehicle speed is determined to be.

7. The speed control device for the vehicle according to claim 6, wherein the target vehicle speed determining means determines the target vehicle speed so that an increase of the target vehicle speed from a value obtained in the case where the operation quantity is zero does not exceed an upper limit, which is preliminarily set.

8. The speed control device for the vehicle according to claim 1, wherein the target vehicle speed determining means determines the target vehicle speed so that an increase of the target vehicle speed from a value obtained in the case where the operation quantity is zero does not exceed an upper limit, which is preliminarily set.

9. A speed control device for a vehicle comprising:
a vehicle speed obtaining means for obtaining a speed of the vehicle;
a shape obtaining means for obtaining a shape of a curve existing ahead of the vehicle;
a reference determining means for determining an appropriate vehicle speed, by which the vehicle is to appropriately travel through the curve, and a reference point, which exists on the curve and which is a point by which the speed of the vehicle is to be decreased down to the appropriate vehicle speed, on the basis of the shape of the curve;
a distance obtaining means for obtaining a relative distance of a zone between the reference point and the vehicle;
a target vehicle speed determining means for determining a target vehicle speed for decreasing the speed of the vehicle down to the appropriate vehicle speed on the basis of the reference point, the appropriate vehicle speed and the relative distance;
a vehicle speed controlling means for controlling the speed of the vehicle on the basis of the target vehicle speed and the speed of the vehicle; and
an acceleration operation quantity obtaining means for obtaining an operation quantity of an acceleration operating member, which is to be operated by a driver of the vehicle, wherein
the target vehicle speed determining means includes a modification means for modifying the target vehicle speed on the basis of the operation quantity so that the target vehicle speed in a case where the operation quantity is greater than zero becomes a greater value than the target vehicle speed in a case where the operation quantity is zero, wherein the modification means starts modifying the target vehicle speed when the operation quantity exceeds a predetermined value which is greater than zero.

10. The speed control device for the vehicle according to claim 9, wherein the target vehicle speed determining means determines the target vehicle speed on the basis of the operation quantity so that the target vehicle speed is allowed to be increased at the zone in the curve, which exists closer to a curve entrance relative to the reference point and at which a curvature radius gradually decreases.

11. The speed control device for the vehicle according to claim 10, wherein the target vehicle speed determining means determines the target vehicle speed in a manner where the greater the operation quantity is, the greater value the target vehicle speed is determined to be.

12. The speed control device for the vehicle according to claim 10, wherein the target vehicle speed determining means determines the target vehicle speed so that an increase of the target vehicle speed from a value obtained in the case where the operation quantity is zero does not exceed an upper limit, which is preliminarily set.

13. The speed control device for the vehicle according to claim 11, wherein the target vehicle speed determining means determines the target vehicle speed so that an increase of the target vehicle speed from a value obtained in the case where the operation quantity is zero does not exceed an upper limit, which is preliminarily set.

14. The speed control device for the vehicle according to claim 9, wherein the target vehicle speed determining means determines the target vehicle speed in a manner where the greater the operation quantity is, the greater value the target vehicle speed is determined to be.

15. The speed control device for the vehicle according to claim 14, wherein the target vehicle speed determining means determines the target vehicle speed so that an increase of the target vehicle speed from a value obtained in the case where the operation quantity is zero does not exceed an upper limit, which is preliminarily set.

16. The speed control device for the vehicle according to claim 9, wherein the target vehicle speed determining means determines the target vehicle speed so that an increase of the target vehicle speed from a value obtained in the case where the operation quantity is zero does not exceed an upper limit, which is preliminarily set.

* * * * *